US011015903B2

(12) United States Patent
Inglefield et al.

(10) Patent No.: US 11,015,903 B2
(45) Date of Patent: May 25, 2021

(54) ENHANCED BALLISTIC PROTECTIVE SYSTEM

(75) Inventors: Charles F. Inglefield, Rocky River, OH (US); Brian D. Barry, Westlake, OH (US); Robert W. Eilmann, North Olmsted, OH (US); William A. Gooch, St. Petersburg, FL (US)

(73) Assignee: American Technical Coatings, Inc., Westlake, OH (US)

( * ) Notice: Subject to any disclaimer, the term of this patent is extended or adjusted under 35 U.S.C. 154(b) by 0 days.

(21) Appl. No.: 14/006,065

(22) PCT Filed: Jun. 8, 2012

(86) PCT No.: PCT/US2012/041642
§ 371 (c)(1),
(2), (4) Date: Sep. 18, 2013

(87) PCT Pub. No.: WO2012/170874
PCT Pub. Date: Dec. 13, 2012

(65) Prior Publication Data
US 2014/0013934 A1    Jan. 16, 2014

Related U.S. Application Data

(60) Provisional application No. 61/520,320, filed on Jun. 8, 2011, provisional application No. 61/587,894, filed on Jan. 18, 2012.

(51) Int. Cl.
*F41H 5/02*        (2006.01)
*B32B 27/40*       (2006.01)
(Continued)

(52) U.S. Cl.
CPC ............... *F41H 5/023* (2013.01); *B32B 3/12* (2013.01); *B32B 3/266* (2013.01); *B32B 5/02* (2013.01);
(Continued)

(58) Field of Classification Search
CPC ...... F41H 5/0421; F41H 5/023; F41H 5/0464; F41H 5/0428; B32B 5/28; B32B 5/02;
(Continued)

(56) References Cited

U.S. PATENT DOCUMENTS 3,319,522 A * 5/1967 Gould ..................... F41A 23/42
                                                    89/1.813
3,742,813 A * 7/1973 Kongelbeck ............ F41F 3/042
                                                    89/1.807
(Continued)

FOREIGN PATENT DOCUMENTS

CA          1335240 C      4/1995
EP          1574810 A1     9/2005
(Continued)

OTHER PUBLICATIONS

William A. Gooch, Jr., An Overview of Protection Technology for Ground and Space Applications, NATO Applied Vehicle Technology Panel, Aalborg, Denmark, Sep. 23-26, 2002.
(Continued)

*Primary Examiner* — Michelle Clement
(74) *Attorney, Agent, or Firm* — Walter | Haverfield LLP; Sean F. Mellino; D. Peter Hochberg

(57) ABSTRACT

A ballistic armor system comprising a metal strike face plate, a laminate composite backing material secured to the metal strike face plate and an air space provided between the metal strike face plate and the laminate composite backing material. The metal strike face plate has a predetermined defined thickness and has a plurality of slotted holes set at an oblique angle relative to the vertical orientation or axis of the metal strike face plate. The plurality of slotted holes is sufficiently small to prevent the passage of a projectile or fragment therethrough. The laminate composite backing material comprises at least one material selected from an aramid fiber material, S-glass, E-glass and UHMWPE, and
(Continued)

is provided in combination with a polymer-based resin material. The air space provided between the metal strike face plate and the composite backing material has a depth in the range between 0-10 inches.

24 Claims, 31 Drawing Sheets

(51) Int. Cl.

| | | |
|---|---|---|
| B32B 27/32 | (2006.01) | |
| B32B 5/28 | (2006.01) | |
| B32B 15/04 | (2006.01) | |
| B32B 15/20 | (2006.01) | |
| B32B 5/18 | (2006.01) | |
| B32B 5/24 | (2006.01) | |
| B32B 27/38 | (2006.01) | |
| B32B 7/12 | (2006.01) | |
| B32B 3/26 | (2006.01) | |
| B32B 15/18 | (2006.01) | |
| B32B 27/42 | (2006.01) | |
| B32B 3/12 | (2006.01) | |
| B32B 27/12 | (2006.01) | |
| B32B 7/08 | (2019.01) | |
| B32B 27/28 | (2006.01) | |
| B32B 5/02 | (2006.01) | |
| F41H 5/04 | (2006.01) | |

(52) U.S. Cl.
CPC ............... *B32B 5/18* (2013.01); *B32B 5/245* (2013.01); *B32B 5/28* (2013.01); *B32B 7/08* (2013.01); *B32B 7/12* (2013.01); *B32B 15/043* (2013.01); *B32B 15/046* (2013.01); *B32B 15/18* (2013.01); *B32B 15/20* (2013.01); *B32B 27/12* (2013.01); *B32B 27/283* (2013.01); *B32B 27/32* (2013.01); *B32B 27/38* (2013.01); *B32B 27/40* (2013.01); *B32B 27/42* (2013.01); *F41H 5/0421* (2013.01); *F41H 5/0428* (2013.01); *B32B 2260/021* (2013.01); *B32B 2260/046* (2013.01); *B32B 2262/0253* (2013.01); *B32B 2262/0269* (2013.01); *B32B 2262/101* (2013.01); *B32B 2266/025* (2013.01); *B32B 2266/0278* (2013.01); *B32B 2307/54* (2013.01); *B32B 2307/558* (2013.01); *B32B 2307/718* (2013.01); *B32B 2307/732* (2013.01); *B32B 2571/00* (2013.01); *B32B 2571/02* (2013.01); *Y10T 428/23* (2015.01)

(58) Field of Classification Search
CPC .. B32B 3/12; B32B 3/266; B32B 5/18; B32B 5/245; B32B 7/08; B32B 7/12; B32B 15/043; B32B 15/046; B32B 15/18; B32B 15/20; B32B 27/12; B32B 27/283; B32B 27/32; B32B 27/38; B32B 27/40; B32B 27/42; B32B 2260/021; B32B 2260/046; B32B 2262/0269; B32B 2262/0253; B32B 2262/101; B32B 2266/025; B32B 2266/0278; B32B 2307/54; B32B 2307/558; B32B 2307/718; B32B 2307/732; B32B 2571/00; B32B 2571/02; Y10T 428/23
USPC ......................................................... 89/36.02
See application file for complete search history.

(56) References Cited

U.S. PATENT DOCUMENTS

| | | | |
|---|---|---|---|
| 4,061,815 A | 12/1977 | Poole, Jr. | |
| 4,286,708 A * | 9/1981 | Porzel | F42B 39/14 206/3 |
| 4,470,336 A * | 9/1984 | Swann | F41A 23/42 89/1.815 |
| 4,471,684 A * | 9/1984 | Johnson | F41F 3/04 89/1.8 |
| 4,573,396 A * | 3/1986 | Streetman | F41H 7/04 109/1 S |
| 4,604,939 A * | 8/1986 | Hoffmeister | F41F 3/042 89/1.8 |
| 4,667,565 A * | 5/1987 | Anderson | F41A 23/20 89/36.08 |
| 4,716,810 A * | 1/1988 | DeGuvera | F41H 5/013 109/83 |
| 4,835,033 A * | 5/1989 | Auyer | E05G 1/024 428/131 |
| 4,836,084 A | 6/1989 | Vogelesang et al. | |
| 4,857,119 A * | 8/1989 | Karst | C21D 9/42 109/78 |
| 4,965,138 A * | 10/1990 | Gonzalez | B62D 25/2054 428/593 |
| 4,981,067 A | 1/1991 | Kingery | |
| 5,007,326 A * | 4/1991 | Gooch, Jr. | F41H 5/013 109/85 |
| 5,014,593 A * | 5/1991 | Auyer | F41H 5/0457 109/84 |
| 5,200,256 A | 4/1993 | Dunbar | |
| 5,221,807 A * | 6/1993 | Vives | F41H 5/023 109/82 |
| 5,330,820 A | 7/1994 | Li et al. | |
| 5,461,961 A * | 10/1995 | Baus | F41A 23/42 89/1.815 |
| 5,601,895 A | 2/1997 | Cunningham | |
| 5,723,807 A | 3/1998 | Kuhn, II | |
| 5,847,307 A * | 12/1998 | Kennedy | F41F 3/0413 89/1.817 |
| 5,970,843 A | 10/1999 | Strasser et al. | |
| 6,125,734 A * | 10/2000 | Yagla | F41F 3/042 89/1.8 |
| 6,135,006 A | 10/2000 | Strasser et al. | |
| 6,230,604 B1 * | 5/2001 | Larson | F41F 3/0413 89/1.812 |
| 6,314,858 B1 | 11/2001 | Strasser et al. | |
| 6,584,881 B1 * | 7/2003 | Boudreau | F41A 23/42 89/1.804 |
| 6,638,572 B1 * | 10/2003 | Inglefield | B22C 9/00 264/117 |
| 6,698,331 B1 | 3/2004 | Yu et al. | |
| 7,040,212 B1 * | 5/2006 | Gaywood | F41F 3/0413 89/1.801 |
| 7,077,048 B1 * | 7/2006 | Anderson, Jr. | F41H 5/04 2/2.5 |
| 7,098,275 B2 * | 8/2006 | Inglefield | B22C 9/00 264/125 |
| 7,191,694 B1 | 3/2007 | Gonzalez | |
| 7,300,893 B2 | 11/2007 | Barsoum et al. | |
| 7,350,451 B2 * | 4/2008 | Barisciano, Jr. | F41F 3/0413 89/36.01 |
| 7,513,186 B2 * | 4/2009 | Ravid | F41H 5/013 89/36.02 |
| 7,546,796 B2 | 6/2009 | Hunn | |
| 7,562,612 B2 | 7/2009 | Lucuta et al. | |
| 7,608,322 B2 | 10/2009 | Thurau et al. | |
| 7,790,252 B2 * | 9/2010 | Nematollahi | B32B 5/28 428/34.7 |
| 7,827,898 B2 | 11/2010 | Park et al. | |
| 7,854,189 B1 * | 12/2010 | Fox | B63G 1/00 89/1.804 |
| 7,866,248 B2 | 1/2011 | Moore, III et al. | |
| 7,913,604 B2 * | 3/2011 | Monteil | F41F 3/073 89/1.8 |

(56) References Cited

U.S. PATENT DOCUMENTS

| | | | |
|---|---|---|---|
| 7,926,407 B1 | 4/2011 | Hallissy et al. | |
| 7,938,053 B1 | 5/2011 | Dudt et al. | |
| 8,096,223 B1* | 1/2012 | Andrews | F41H 5/0492 89/36.02 |
| 8,225,704 B2* | 7/2012 | Ogrin | C04B 35/053 156/245 |
| 8,234,965 B2* | 8/2012 | Ravid | F41H 5/0492 109/49.5 |
| 8,266,999 B1* | 9/2012 | Sisemore | F41A 23/36 244/3.1 |
| 8,375,841 B2* | 2/2013 | Bocini | F41H 5/023 89/36.02 |
| 8,443,707 B2* | 5/2013 | Skurdal | F41F 3/073 89/1.8 |
| 8,459,167 B1* | 6/2013 | Gonzalez | F41H 7/042 296/187.07 |
| 8,468,926 B2* | 6/2013 | Treadway | F41H 5/023 89/36.02 |
| 8,505,432 B2* | 8/2013 | Kidd | B32B 37/02 109/49.5 |
| 8,667,879 B2* | 3/2014 | Kidd | B32B 37/02 109/49.5 |
| 9,038,332 B1* | 5/2015 | Littlestone | F41H 5/0457 52/202 |
| 9,097,495 B1* | 8/2015 | Kesterson | F41H 5/04 |
| 9,261,329 B2* | 2/2016 | Kempas | F41F 3/042 |
| 9,360,277 B2* | 6/2016 | Kalms | F41F 3/073 |
| 9,470,481 B2 | 10/2016 | Livesey et al. | |
| 9,784,532 B1* | 10/2017 | Sisemore | F41F 3/04 |
| 2004/0216595 A1* | 11/2004 | Dickson | F41H 5/0464 89/36.02 |
| 2005/0257677 A1 | 11/2005 | Ravid et al. | |
| 2006/0030226 A1* | 2/2006 | Park | F41H 5/0464 442/135 |
| 2006/0065111 A1 | 3/2006 | Henry | |
| 2006/0162537 A1 | 7/2006 | Anderson et al. | |
| 2006/0213360 A1* | 9/2006 | Ravid | F41H 5/013 89/36.01 |
| 2007/0240621 A1 | 10/2007 | Qiao | |
| 2007/0293107 A1* | 12/2007 | Folio | B32B 3/12 442/134 |
| 2008/0041222 A1* | 2/2008 | Barisciano, Jr. | F41F 3/0413 89/36.15 |
| 2008/0171166 A1* | 7/2008 | Nematollahi | B32B 5/28 428/35.9 |
| 2008/0264244 A1 | 10/2008 | Ravid et al. | |
| 2009/0031887 A1* | 2/2009 | Monteil | F41F 3/073 89/1.8 |
| 2009/0095147 A1 | 4/2009 | Tunis et al. | |
| 2009/0214812 A1 | 8/2009 | Bartus et al. | |
| 2009/0293709 A1 | 12/2009 | Joynt et al. | |
| 2009/0320676 A1 | 12/2009 | Cronin et al. | |
| 2010/0212486 A1 | 8/2010 | Kurtz et al. | |
| 2010/0282062 A1 | 11/2010 | Sane et al. | |
| 2010/0282150 A1* | 11/2010 | Onuk | F41A 23/20 114/15 |
| 2010/0294123 A1 | 11/2010 | Joynt et al. | |
| 2011/0036234 A1* | 2/2011 | Fisher | F41H 5/0414 89/36.02 |
| 2011/0167995 A1* | 7/2011 | Goasduff | B63G 1/00 89/1.819 |
| 2011/0167998 A1* | 7/2011 | Lyons | B29C 33/68 89/36.02 |
| 2011/0192274 A1* | 8/2011 | Fingerhut | F41H 5/0435 89/36.02 |
| 2011/0239851 A1* | 10/2011 | Mason | B32B 27/04 89/36.02 |
| 2011/0296979 A1* | 12/2011 | Howland | B32B 3/16 89/36.02 |
| 2012/0024137 A1* | 2/2012 | Chiou | B32B 5/12 89/36.02 |
| 2012/0036987 A1* | 2/2012 | Guruprasad | F41A 23/34 89/1.806 |
| 2012/0060676 A1* | 3/2012 | Kidd | B32B 37/02 89/36.02 |
| 2012/0060678 A1* | 3/2012 | Peters | B29C 70/06 89/36.02 |
| 2012/0090454 A1* | 4/2012 | Treadway | F41H 5/023 89/36.02 |
| 2012/0174747 A1* | 7/2012 | Hummel | F41H 5/0414 89/36.02 |
| 2012/0186433 A1* | 7/2012 | Braiewa | B32B 5/18 89/36.02 |
| 2012/0216669 A1* | 8/2012 | Bovenschen | F41H 5/0485 89/36.02 |
| 2012/0234164 A1* | 9/2012 | Kucherov | F41H 5/0407 89/36.02 |
| 2012/0266744 A1* | 10/2012 | Lyons | B29C 33/68 89/36.02 |
| 2012/0325076 A1* | 12/2012 | Monette, Jr. | F41H 5/0464 89/36.02 |
| 2013/0061739 A1* | 3/2013 | Cheong | F41H 5/007 89/36.02 |
| 2013/0180393 A1* | 7/2013 | Kienzle | F41H 5/0414 89/36.02 |
| 2013/0284003 A1* | 10/2013 | Dodworth | F41H 5/023 89/36.02 |
| 2013/0284004 A1* | 10/2013 | Hanks | F41H 1/08 89/36.02 |
| 2013/0284007 A1* | 10/2013 | de Haas | F41H 5/0435 89/36.02 |
| 2014/0000802 A1* | 1/2014 | Kidd | B32B 37/02 156/247 |
| 2014/0013934 A1* | 1/2014 | Inglefield | F41H 5/023 89/36.02 |
| 2014/0041517 A1* | 2/2014 | Leeming | F41H 5/04 89/36.02 |
| 2014/0076140 A1* | 3/2014 | Ravid | F41H 5/0492 89/36.02 |
| 2014/0109756 A1* | 4/2014 | Aghjanian | C04B 41/009 89/36.02 |
| 2014/0116234 A1* | 5/2014 | Jacq | F41A 23/20 89/1.11 |
| 2014/0224104 A1* | 8/2014 | Kempas | F41F 3/042 89/1.815 |
| 2014/0305293 A1* | 10/2014 | Kucherov | F41H 5/0407 89/36.02 |
| 2015/0345913 A1* | 12/2015 | Inglefield | F41H 5/0428 89/36.02 |

FOREIGN PATENT DOCUMENTS

| | | |
|---|---|---|
| WO | 91/00490 A1 | 1/1991 |
| WO | WO91/00490 | 1/1991 |
| WO | 2009/096956 A1 | 8/2009 |
| WO | 2009096956 A1 | 8/2009 |
| WO | 2011/094740 A2 | 8/2011 |
| WO | 2012/010829 A1 | 1/2012 |
| WO | 2012010829 A1 | 1/2012 |

OTHER PUBLICATIONS

MIL-PRF-32269 (MR), Oct. 18, 2007, Performance Specification, Perforated Homogeneous Steel Armor, U.S. Dept. of Defense, AMSC NA, FSC 9515.

International Search report and Written Opinion dated Nov. 27, 2015 issued in related PCT/US15/21303.

EPO Search Report issued in a corresponding EP Application, dated May 22, 2015.

EPO Supplementary Partial European Search Report dated Jan. 16, 2015.

Office action issued in corresponding EPO App. No. 12796778.4 dated Jun. 24, 2016.

Office Action from the Canadian Intellectual Property Office dated Jul. 11, 2017 for corresponding CA Application No. 2,864,692.

(56) References Cited

OTHER PUBLICATIONS

Communication and Supplementary European Search Report from the European Patent Office dated Oct. 9, 2017 for corresponding EP Application No. 15795701.0.
Written Opinion of the International Searching Authority dated Aug. 10, 2012 for corresponding International Application No. PCT/US2012/041642.
International Search Report of the International Searching Authority dated Aug. 10, 2012 for International Application No. PCT/US2012/041642.
Examination Report No. 1 from IP Australia dated Apr. 28, 2016 for corresponding AU Application No. 2012267563.
Examination Report No. 2 from IP Australia dated Apr. 24, 2017 for corresponding AU Application No. 2012267563.
Office Action from the Canadian Intellectual Property Office dated Jan. 24, 2018 for corresponding CA Application No. 2,864,692.
Communication pursuant to Article 94(3) from the European Patent Office dated Aug. 29, 2018 for corresponding European Patent Application No. 15795701.0.

\* cited by examiner

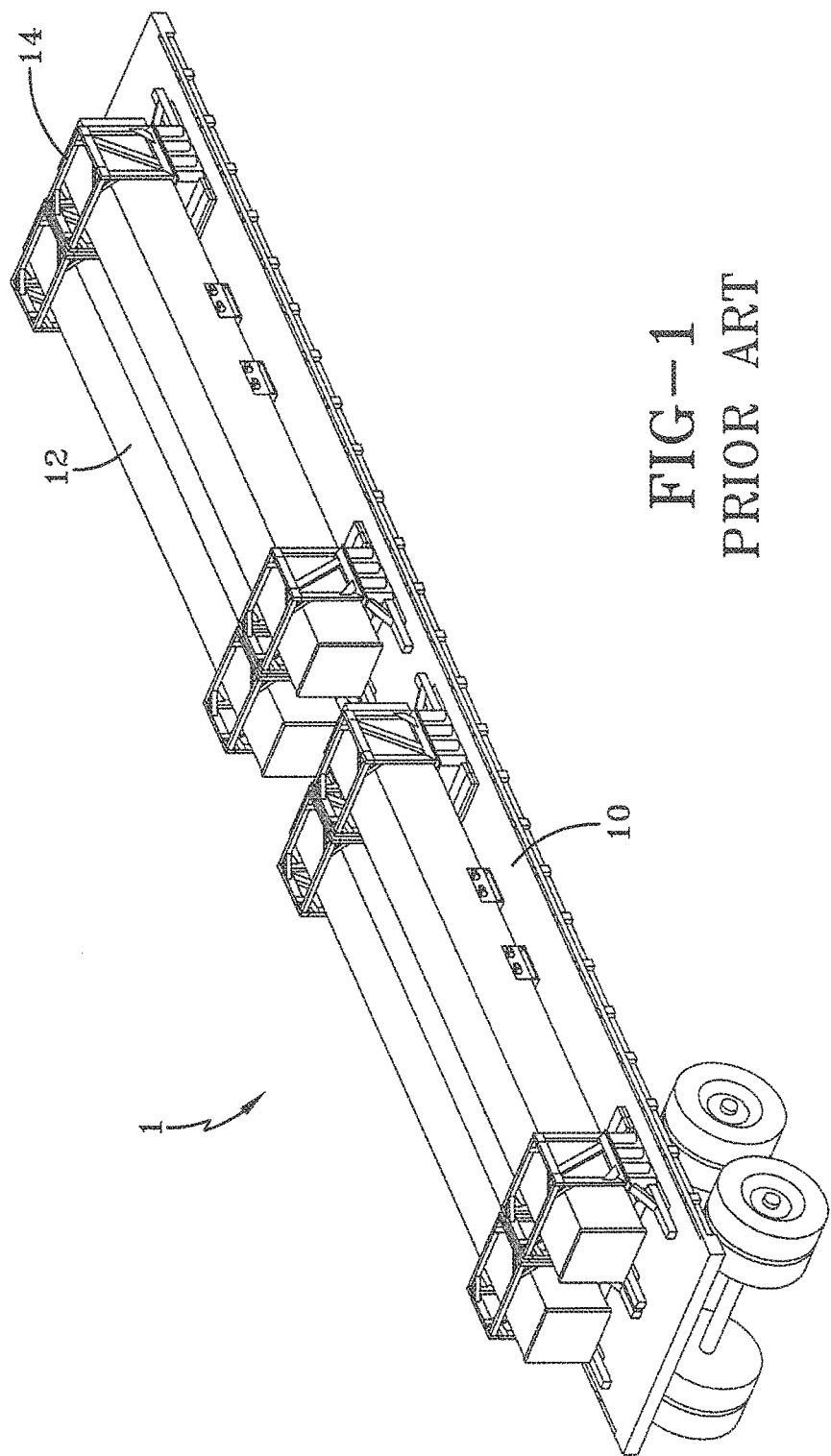

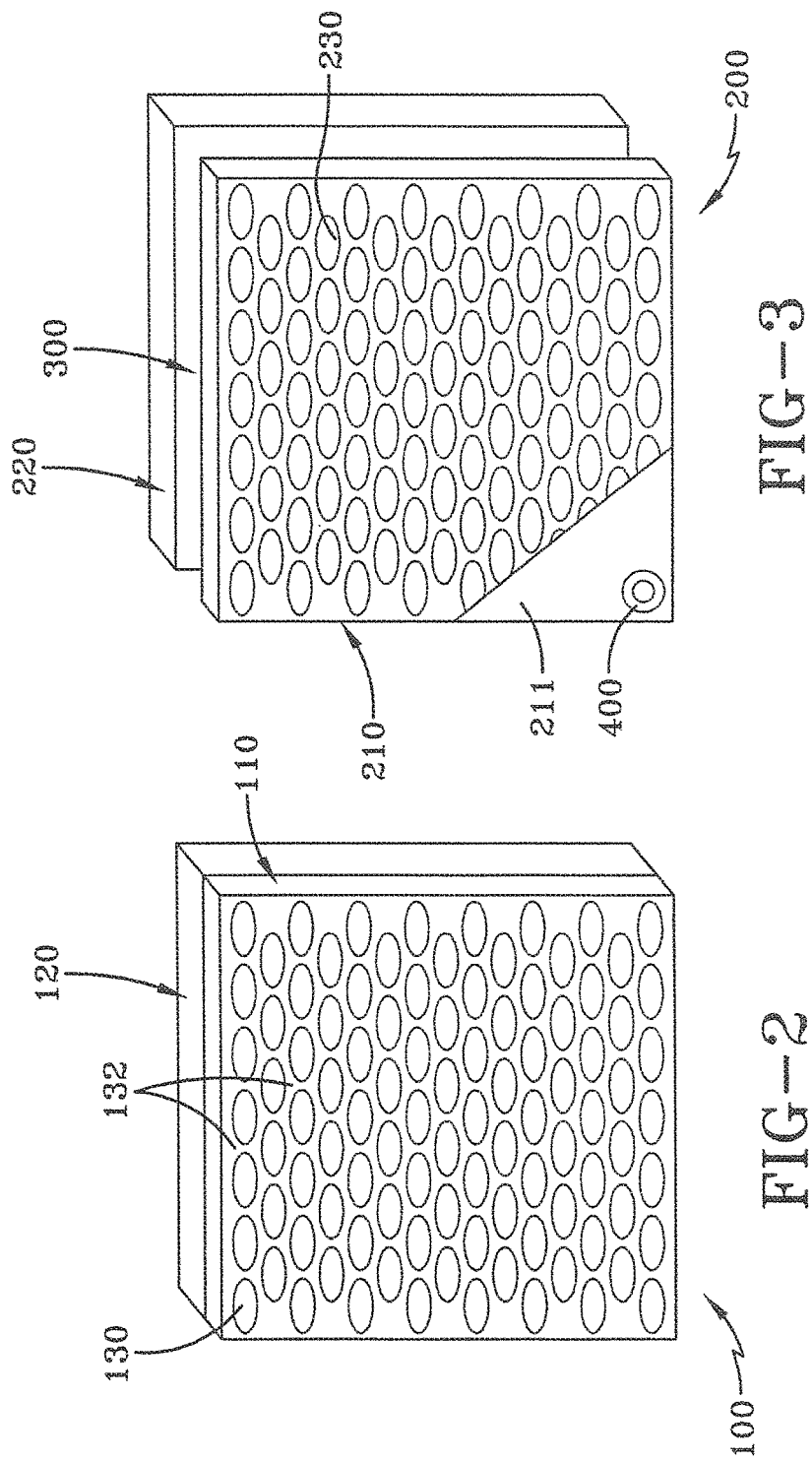

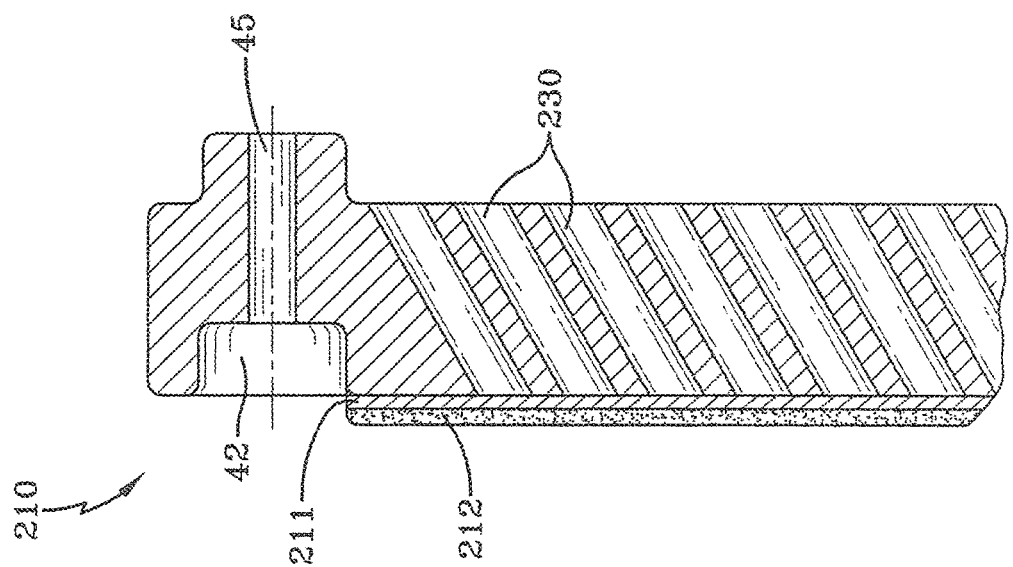
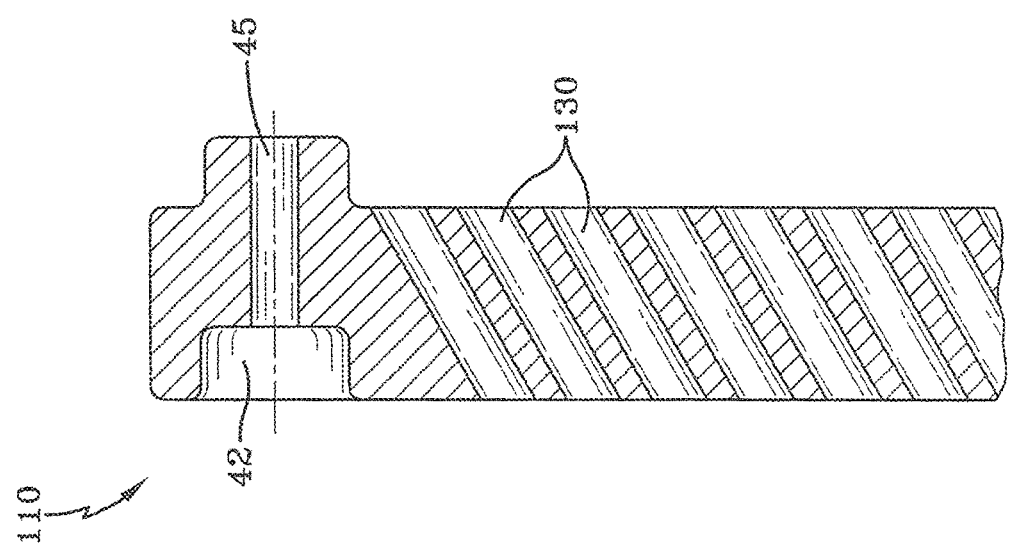

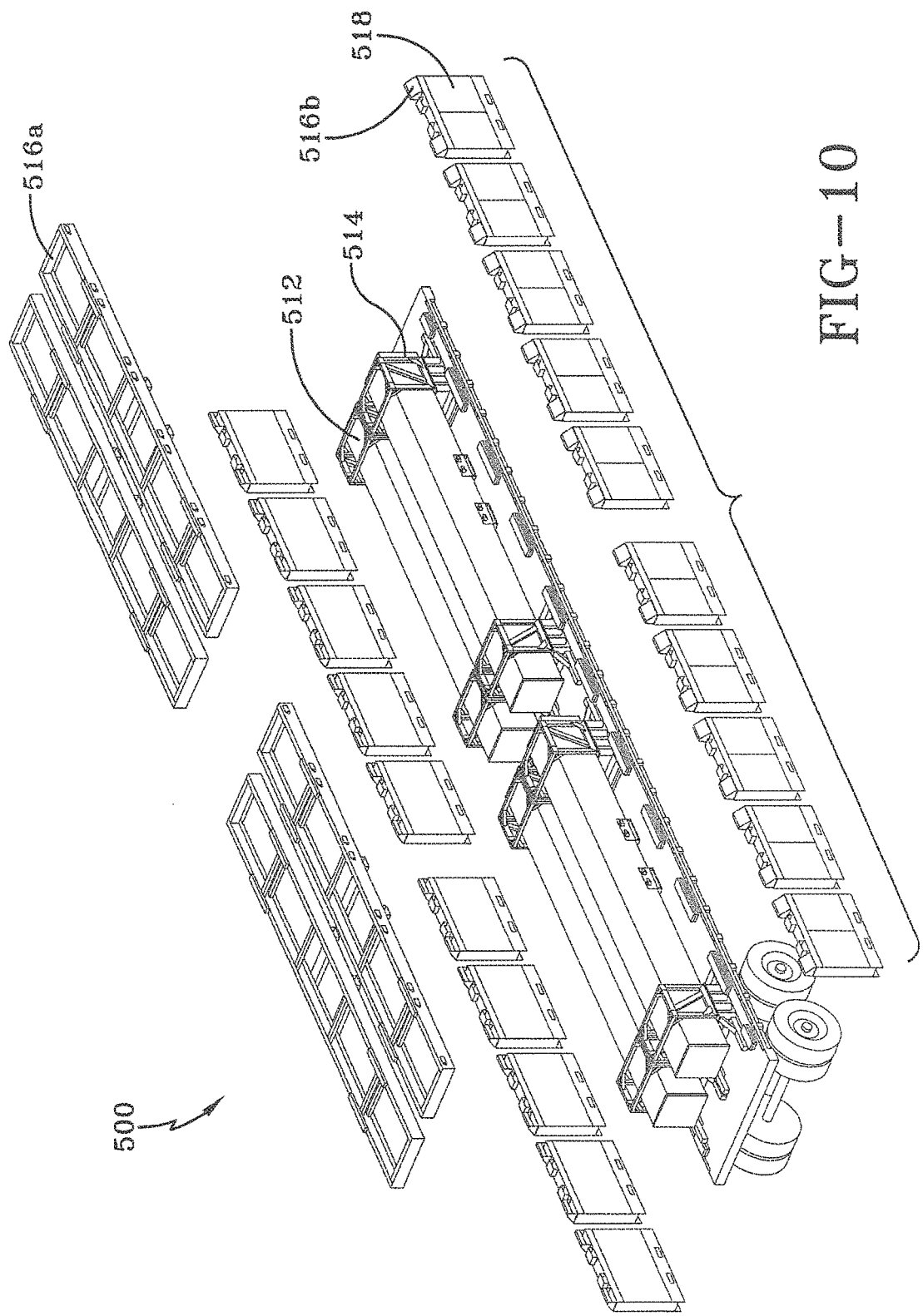

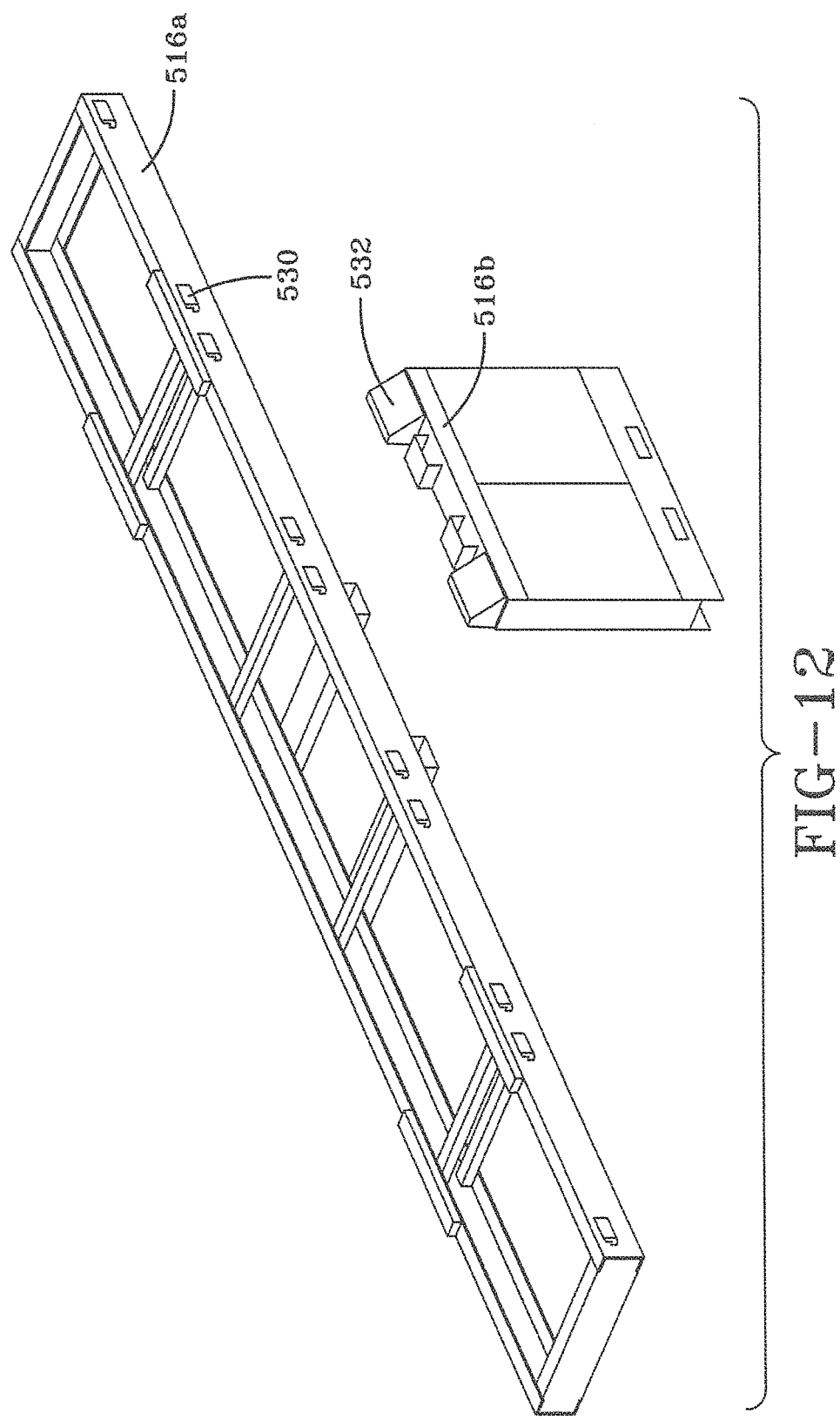

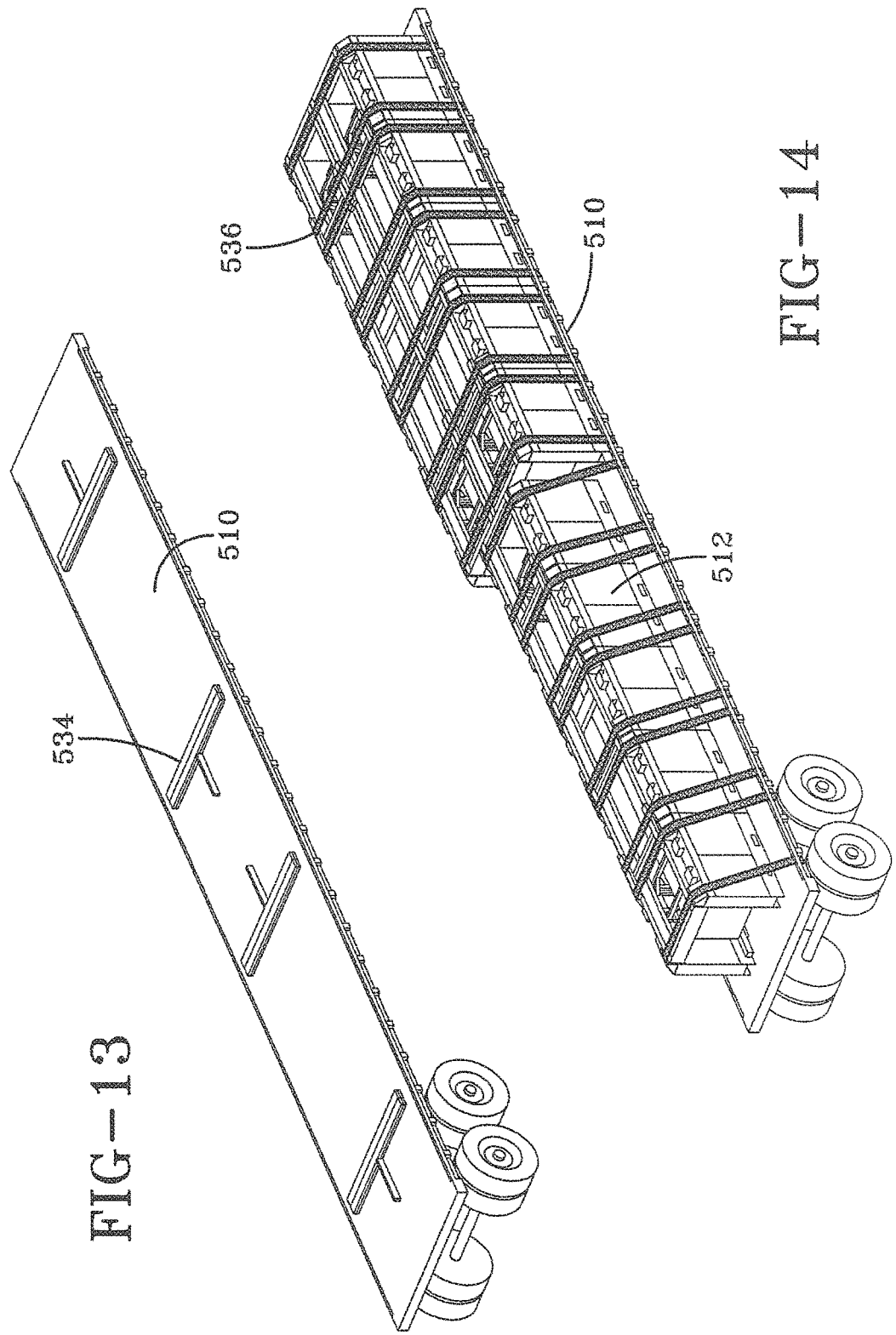

Overall General Test Configuration

Bullet Impact Instrumentation Setup

Fragment Impact Test Setup

Fragment Impact Test Instrumentation Setup

TABLE 5 - FRAGMENT REACTION

ENHANCED BALLISTIC PROTECTIVE SYSTEM

CROSS-REFERENCE TO RELATED APPLICATION

This application claims the benefit of International Application No. PCT/US2012/041642 filed Jun. 8, 2012, under Title 35, United States Code, Section 371, and claims the benefit of U.S. Provisional Application No. 61/520,320, filed Jun. 8, 2011, under Title 35, United States Code, Section 119(e), and U.S. Provisional Application No. 61/587,894, filed Jan. 18, 2012, under Title 35, United States Code, Section 119(e), the entire disclosures of which are incorporated herein by reference in their entireties.

STATEMENT OF GOVERNMENTAL SUPPORT

The framework structure for a possible use of the invention was made with government support under N00024-07-C-5361 and/or N00024-03-D-6606 awarded by the Department of the Navy. The government has certain rights in the framework structure for a possible use of the invention, but does not have rights in the invention per se.

FIELD OF THE INVENTION

The present invention generally relates to ballistic armor systems. More particularly, the present invention relates to an enhanced ballistic armor system for protection of individuals, structures, vehicles and the like against high velocity and high caliber projectiles. These projectiles can include high caliber bullets, rockets, exploding grenades, exploding mortar shells, exploding mines and the like.

DESCRIPTION OF THE PRIOR ART

Ceramic-based armors and armor systems are well known in the art. However, many conventional armors and armor systems tend to be too heavy and/or bulky to be easily employed as a protection system against high caliber artillery and projectiles. Moreover, many conventional armors and armor systems can also tend to be too expensive for practical use or manufacture. Furthermore, ballistic armor and armor systems are subjected to a variety of projectiles or fragments over a wide range of velocities designed to defeat the armor or armor systems by penetrating the armor or armor systems, or by causing an impact against the armor or armor system that can cause spalling (i.e., flaking off of material from on object due to impact from another object), in particular spalling through mechanical stress which in turn eventually defeats the armor.

Many and various types of armor and armor systems are known for protecting personnel, vehicles, equipment and the like from damage or destruction caused by high caliber artillery and projectiles. Many such armor and armor systems are employed in military applications to protect individuals (such as via body armor), aircraft, tanks, ships and vehicles from damage or destruction caused by high caliber artillery and projectiles. In yet other applications, many such armor and armor systems are employed in military applications to protect missiles during their storage or transport, such as for example in the form of canisters in which the missiles are stored, held or transported.

The use of such armor or armor systems for protecting missiles maintained in protective canisters during storage or transport of the missiles is also well known. However, one known disadvantage in such armored applications is the allowable road weight that limits the numbers of encased missiles from being transported together. Due to the strict road weight limits, the excessive load created by the combined weight of the missiles, truck, etc. allows for only a few (e.g., 1-4) missiles to be transported together. For example, the Department of Transportation (DOT) has established that the total road weight of a truck, including the weight of the load, cannot exceed 80,000 pounds per vehicle. It should of course be understood that different trucks have different weights, while the specific weight of the particular load, such as missiles to be transported and the respective container or canister, can vary depending on the nature of the type of missile at issue. Typically, the combined weight of a single missile and the respective canister may be about 7,500 pounds. Nevertheless, the combined weight of the truck and the missiles being transported which comprise the respective load cannot exceed 80,000 pounds. Consequently, the missiles are oftentimes unprotected (i.e., lack a protective canister) in order to maximize the number of missiles that are transported together while also meeting the strict road weight limits or only have the standard protective canisters without additional protective means. Oftentimes, the excessive load caused by the combined weight of the missiles and storage protective canister allows for just one, or at most two, missiles to be transported together. In the event more missiles are transported, such as 3-4, the transport might be done in a manner without any additional protection in which case the missiles are vulnerable to attack. To achieve the requirement of not exceeding the 80,000 pound load limit, the protective system of the present invention may be provided at a weight in the range of about 18-30 lb/ft$^2$. However, it should be appreciated that the specific weight per ft$^2$ in accordance with the present invention depends on the specific nature of the application type with which the present invention is employed.

Another significant disadvantage with conventional armor systems in the case of armor systems employed as protection for vehicles is that the excessive weight of the armor systems can tend to render the vehicles relatively immobile, or at least significantly slower. This in turn can tend to cause the vehicles to be more vulnerable to attacks by high velocity and high caliber projectiles, and more significantly more vulnerable to attack, and even more significantly more vulnerable to repeated attacks by projectiles or fragments of projectiles.

In some known applications, the armor or armor systems is incorporated into the structure that is to be protected. Such applications can include military vehicles, armored vehicles or missile storage canisters. In such applications, it is typically not possible for the armor or armor systems to be temporarily applied but rather thus tend to be permanent aspects of the structure. In this regard, the armor systems can be difficult or even impossible to replace in the event of damage or failure.

In order to address the issue of weight in armor or armor systems, some conventional systems employ ceramic materials that can protect against a range of projectiles or fragments of projectiles. Ceramic tiles can often be used to break up and dissipate the energy of high caliber projectiles, and can be applied in specific thicknesses or patterns of the arrangement of tiles to maximize effectiveness. However, a disadvantage of conventional ceramic tiles is that ceramic is brittle and is more susceptible to cracking after impact, thus reducing the effectiveness against subsequent impacts. Cracking of the conventional ceramics can also leave the underlying structure to be protected vulnerable to exposure to outside elements, such as water, air, heat, cold, wind, chemicals, biological agents, etc., thereby further weakening the structure to be protected.

Projectiles, such as armor piercing ammunition, are designed to specifically penetrate conventional armor and armor systems. Conventional ceramic-faced armor systems were consequently developed to defeat armor piercing ammunition. For example, at impact, the projectile can be blunted or otherwise damaged by the conventional ceramic-faced armor system. At the same time, cracking or other damage to the conventional ceramic-faced armor system is inevitable which leads to a weakening of the integrity of the conventional ceramic-faced armor system and thus more vulnerable to future attacks.

Some specific examples of conventional prior art armor and armor systems are now set forth below.

U.S. Publication No. 2009/0320676 (Cronin, et al.) is directed to the use of an armor for protection against projectiles having a ceramic layer with a confinement layer on the front thereof. The ceramic layer is backed by a first metallic layer and the first metallic layer in turn is backed by a composite layer. The composite layer is backed by a second metallic layer, which in turn is backed by an anti-trauma layer.

WO 91/00490 (Prevorsek, et al.) discusses a composite ballistic article comprising at least one hard rigid layer, at least one fibrous layer and a void layer between the rigid layer and the at least one fibrous layer. The relative weight percents of the hard rigid layer and the fibrous layer(s), and the relative positions of the layers are such that the article is said to exhibit a mass efficiency equal to or greater than about 2.5.

U.S. Pat. No. 4,061,815 (Poole, Jr.) discusses a laminated sheet material having high impact resistance for use in with armor plates. One or more layers of cellular or non-cellular polyurethane is sandwiched between a rigid, high impact resistant sheet of material, such as aluminum armor plate and fiberglass, in the one face and a thin retaining skin on the other. A filler, such as ceramic, particulate refractory or strip metal, can be embedded in the polyurethane layer(s).

U.S. Publication No. 2010/0212486 (Kurtz, et al.) discusses a strike plate including a base armor plate having an outwardly facing surface and a hard layer deposited on the base armor plate to substantially overlay the outwardly facing surface. A ballistic attenuation assembly is allegedly provided having multiple sheets of a first fibrous material and a sheet of a second fibrous material laminated together by a modified epoxy resin with the first sheet of a second fibrous material being exposed along an outward facing surface. An alternative ballistic attenuation assembly is also discussed having a first panel having opposed inward and outward facing surfaces, a second panel having opposed inward and outward facing surfaces, and a spacer interposed between the first and second panels forming a gap between the inward facing surfaces of the first and second panels.

U.S. Pat. No. 5,200,256 (Dunbar) discusses an armor lining for protecting objects from high velocity projectiles having an extended sheet-like body having a weight of less than eight pounds per square foot and having an inner strike surface being positioned away from the object to be protected. A first layer of woven fabric material is carried at a position adjacent the outer strike surface layer and a second layer of material is carried internally of the woven layer between the outer strike surface and an inner attachment surface. A third layer of energy absorbent material is positioned adjacent the inner attachment surface and interfaces with the second fabric layer.

U.S. Publication No. 2009/0293709 (Joynt, et al.) discusses an armor system for protecting a vehicle from high energy projectiles having a leading layer, relative to the projectile trajectory, positioned exterior to the hull, a first plurality of sheet-like layers of a low density material positioned between the leading layer and the hull; and a second plurality of sheet-like high strength metal layers positioned between the leading layer and the hull. The individual ones of the first plurality of high strength metal layers are positioned alternating with and to the rear of individual ones of the second plurality of low density material layers. The leading layer can be one of a sheet-like metallic layer, a metalicized grid layer, and the outer-most layer of the first plurality of low materials layers. The materials of the high strength metal layers can be steel and high strength aluminum, and the materials of the low density material may be low density polypropylene composites and R-Glass composites.

U.S. Publication No. 2010/0294123 (Joynt, et al.) discusses a modular armor system having a leading layer with a metal and an intermediate sheet-like layer of a low density material lesser than that of metal, abutting a rear surface of the leading layer. The armor system also has an intermediate sheet-like layer having glass fiber material and abutting a rear surface of the intermediate low density material layer, and an intermediate sheet-like layer having metal and abutting a rear surface of the intermediate glass fiber layer.

U.S. Pat. No. 4,836,084 (Vogelesang, et al.) discusses an armor plate composite having four main components, namely, a ceramic impact layer, a sub-layer laminate, a supporting element and a backing layer. The ceramic layer serves for allegedly blunting the tip of a projectile. The sub-layer laminate of metal sheets alternate with fabrics impregnated with a viscoelastic synthetic material for absorbing the kinetic energy of the projectile by plastic deformation. The backing layer away from the side of impact consists of a pack of impregnated fabrics.

U.S. Publication No. 2006/0065111 (Henry) discusses an armor system having an outer case of woven or unidirectional fibers filled with one or more protective materials. The outer case includes a pressure sensitive adhesive bonded to one side for allegedly quick and easy application to a body to be protected. The protective materials may include ceramic material which may be in the form of ceramic tile sheets, loose ceramic balls or perforated tiles, multiple layers of woven or unidirectional cloth and steel mesh.

With reference to FIG. 1, a conventional prior art protective system for the transport of missiles is shown and referenced generally at numeral 1. As shown in FIG. 1, the conventional prior art system includes a flatbed trailer 10 being of a standard dimension of about 53'×102" and a set of missiles (not shown) inside a corresponding protective canister 12. Protective canister 12 may comprise any missile protective material known in the art, such as steel. A frame 14 is provided for securing each canister 12 to the flatbed trailer 10. Frame 14 may comprise any material conventional in the art, such as wood or steel. As depicted in FIG. 1, the conventional prior art system for the transport of missiles inside protective canisters 12 lacks any additional type of protective structure since an additional protective structure that would provide sufficient protection to the canisters 12 would be too heavy and thus would cause the weight of the entire load to exceed 80,000 pounds. Therefore, an additional protective structure cannot be employed and the missiles must be transported in a vulnerable manner as shown in FIG. 1.

Thus, there is a need for an armor system that can defeat a range of projectiles and fragments over a wide velocity range from anti-armor devices while reducing overall armor thickness, and which is capable of defeating multiple close proximity strikes from these projectiles. Moreover, there is a need for such an armor system that is relatively inexpensive to manufacture, relatively easy to manufacture and relatively easy to employ in a variety of applications, including but not limited to body armor and missile canister protective armor.

SUMMARY OF THE INVENTION

In accordance with the preferred embodiment of the present invention, the present invention is an armor system comprising the combination of a perforated metal or expanded metal strike face plate (also known as a tipping plate or an appliqué armor) and a laminate composite backing. The metal strike face plate may be, for example, steel or steel alloys, cast irons, aluminum, magnesium, titanium, and the like, or any combination thereof. A thin composite skin or metal skin may cover the front face of the strike plate for protection from outside elements. An example of the perforated metal strike face plate is that found in U.S. Pat. No. 5,007,326 (Gooch, et al.), the details of which are incorporated herein by reference.

The laminate composite backing may comprise a cross-sectional composition of a backing material of fibers, such as KEVLAR® fibers, E-glass, S-Glass, Ultrahigh Molecular Weight Polyethylene (UHMWPE), including fibrous UHMWPE such as a pressed Spectra Shield II® SR-3130 ballistic composite material from Honeywell Advanced Fibers and Composites, Colonial Heights, Va., with polymer resin binders such as, but not limited to, silicones, epoxies, polyethylenes, polyurethanes, and polyureas, such as those disclosed in U.S. Pat. Nos. 6,638,572 and 7,098,275 (both to Inglefield), the details of which are incorporated herein by reference. The laminate composite backing may be enclosed or encased within a surrounding support layer of a silicone, epoxy, polyurethane, and/or polyurea, such as those disclosed in U.S. Pat. Nos. 6,638,572 and 7,098,275 (both to Inglefield) to encase the cross-sectional composition during application.

An air space may be present between the strike face plate and the laminate composite backing. The air space may be provided in the range from about 0 to at least 10 inches depending on the specific type of application with which the present invention armor system is employed, in particular in the range from about 0-8 inches, and more particularly in the range from about 4-6 inches. The air space in accordance with the present invention may be filled with an energy absorbing foam material or other comparable energy absorbing material, such as but not limited to a low density foam, and in particular, but not limited to, a polyurethane-based foam or a polypropylene-based foam. It should be appreciated that air space having zero inches in depth would be having no air space employed in accordance with the present invention.

The armor system according to the present invention is designed to defeat steel or high density cored projectiles of tungsten carbide or tungsten alloy by fracture, erosion and enhanced rotation via the strike face plate. In accordance with the armor system of the present invention, the remaining energy and projectile fragments are then absorbed in the laminate composite backing.

The armor system according to the present invention can be used for various applications such as tanks, trucks, vehicles, individual protective systems, aircraft, barriers, protective structures and missile storage containers or canisters.

It is an object of the present invention to provide an improved armor system for protection against high velocity projectiles, including steel or high density cored projectiles of tungsten carbide or tungsten alloy.

It is another object of the present invention to provide an improved armor system that is relatively lightweight relative to conventional armor systems.

It is yet another object of the present invention to provide an improved armor system having reduced or comparable production costs relative to conventional armor systems.

It is an object of the present invention to provide an armor or armor system and a method of construction thereof, that is lightweight and relatively thin, yet provides protection against projectiles and fragments.

It is a further object of the present invention to provide an armor or armor system and a method of construction where the armor can be used as protective armor for vehicles or missile transport canisters, and the like, with reduced deformation and destruction when impacted by projectiles and fragments.

Yet another object of the present invention is to provide an armor system that meets all relevant and required military standards and requirements for weight and size for the specific type of application with which the system of the present invention is employed, and for defeating projectiles and fragments.

Still yet another object of the present invention is to provide an armor system that provides an improved multi-hit capacity.

It is to be understood that both the foregoing general description and the following detailed description are exemplary and explanatory only and are intended to provide a further explanation of the present invention, as claimed.

Other objects of the present invention will become apparent from the description to follow and from the appended claims.

BRIEF DESCRIPTION OF THE DRAWINGS

FIG. 1 is a perspective view of a prior art missile container transport system.

FIG. 2 is a perspective view of a first embodiment of the armor system according to the present invention.

FIG. 3 is a perspective view of a second embodiment of the armor system according to the present invention.

FIG. 6 is a cutaway cross-sectional view of the strike face plate according to one embodiment of the present invention.

FIG. 7 is a cutaway cross-sectional view of the strike face plate according to an alternative embodiment of the present invention.

FIG. 10 is an exploded perspective view of the armor system according to the present invention in an exemplary application of use.

FIG. 12 is an exploded perspective view of a frame system for use with the armor system according to the present invention in an example application of use as shown in FIG. 10.

FIG. 13 is a perspective view of a flatbed truck trailer for use with the armor system according to the present invention in an example application of use as shown in FIG. 10.

FIG. 14 is a perspective view of the armor system according to the present invention in an alternative example application of use.

DETAILED DESCRIPTION OF THE PREFERRED EMBODIMENTS

Figure 3B:
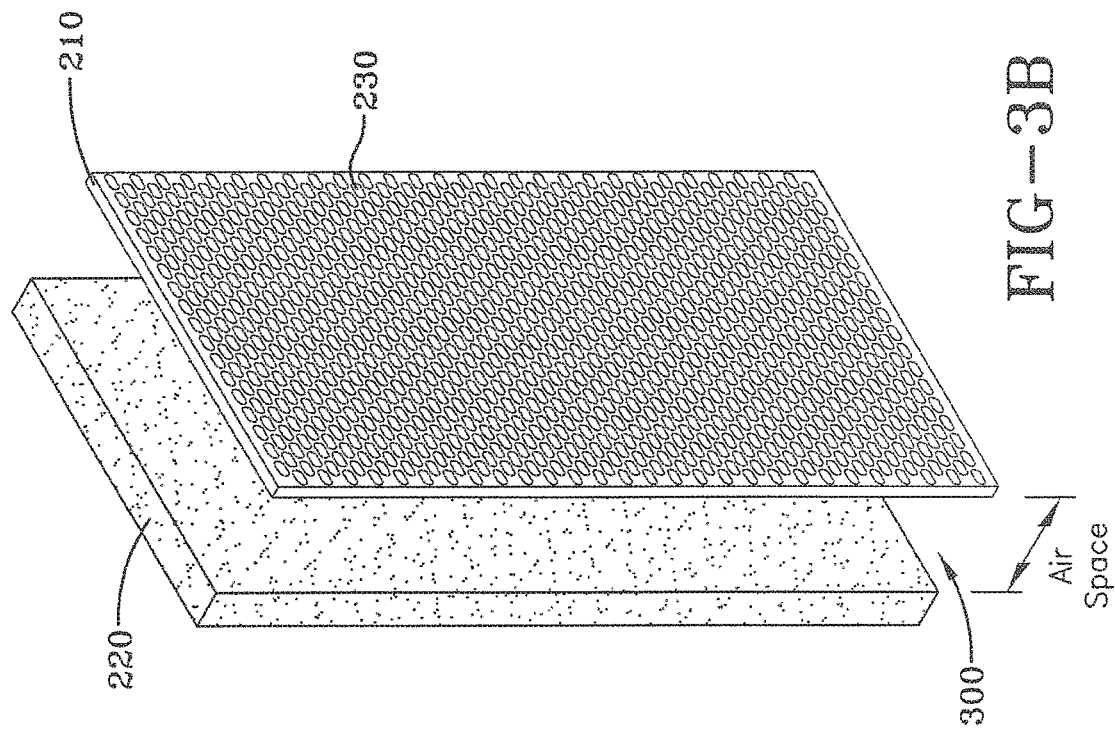
FIG. 3B is a perspective view of the second embodiment of the armor system as shown in FIGS. 3 and 3A.

The present invention is now described with reference to the drawings, wherein like reference numerals are used to refer to like elements throughout. In the following description, for purposes of explanation, numerous specific details are set forth in order to provide a thorough understanding of the present invention. It will be evident, however, to one skilled in the art that the present invention may be practiced without these specific details.

Turning now to FIGS. 2, 3, 3A and 3B, the armor system according to a first embodiment (FIG. 2) and a second or alternative embodiment (FIG. 3) of the present invention is shown generally at numerals 100 and 200, respectively. Armor systems 100 and 200 both comprise a perforated metal or expanded metal strike face plate 110, 210 and a laminate composite backing 120, 220. It should be appreciated that multiple layers of both strike face plate and/or laminate composite backing may be employed in accordance with the present invention. However, for purposes of explanation a single layer of both strike face plate and laminate composite backing is shown and described herein. It should also be appreciated that any type, configuration, design or style of strike face plate (i.e., tipping plate) may be employed with the present invention as known in the art. However, for purposes of explanation, particular versions of the strike face plate (i.e., tipping plate) are shown and described herein. The term "strike face plate" refers to a high strength metal that has a front face surface that would receive the initial impact of a projectile or shock waves or material from a blast. The back surface of the strike face plate can be adjacent to the front surface of the laminate composite backing in one embodiment of the present invention. In other words, the perforated metal or expanded metal strike face plate provides a ballistic strike face which is the first layer of the ballistic armor or armor system that is struck by a projectile or fragment. The perforated metal or expanded metal plate 110, 210 absorbs a portion of the kinetic energy of the high caliber/high velocity projectile to strip down (i.e., weaken) the projectile by deforming it and to significantly reduce the velocity of the projectile. In accordance with a preferred embodiment of the present invention, strike face plate 110, 210 is provided at a thickness in the range of about 0.25-1.5 inches. More particularly, in accordance with the present invention, strike face plate 110, 210 is provided at a thickness in the range of about ½ inch to ⅝ inch. It should be appreciated that the particular thickness of strike face plate 110, 210 depends on the specific application with which the present invention is employed.

Perforated metal or expanded metal strike face plate 110, 210 may be a material that is for example, but not limited to, steel or steel alloys, cast irons, aluminum, magnesium, titanium and the like, or a combination thereof. In a preferred embodiment, strike face plate 110, 210 may comprise a cast iron material such as a cast steel material, i.e., ductile cast iron. As noted above, an example of a perforated metal strike face plate is that found in U.S. Pat. No. 5,007,326 (Gooch, et al.), noted above and which is incorporated herein by reference in its entirety. It should be appreciated, however, that strike face plate 110, 210 can be any buffer plate of a high strength material that receives impact or impact-induced stress waves prior to a shock-absorbing element. In this regard, strike face plate 110, 210 can alternatively be a flat sheet of a high strength metal, or polymer-based composite such as a fiber-reinforced polymer composite. It should be appreciated that any wrought iron plate or casting in accordance with MIL-PRF-32269 would be in accordance with the present invention. In particular, it should be appreciated that MIL-PRF-32269 provides that 4130 steel alloy and 4330 steel alloy are acceptable alloys for cast perforated plate (Class 2 armor), that MIL-A-12560 rolled homogenous steel (Class 1a armor) and MIL-A-46100 high hard rolled homogenous steel armor (Class 1b armor) is acceptable for imparting a hole pattern into to make perforated plate. These are examples of perforated material types which are qualified to date and are by no means comprehensive. It should be appreciated by the skilled artisan that other candidate alloys for making cast perforated plates (or alternatives, e.g., expanded metal) may exist.

Figure 5:
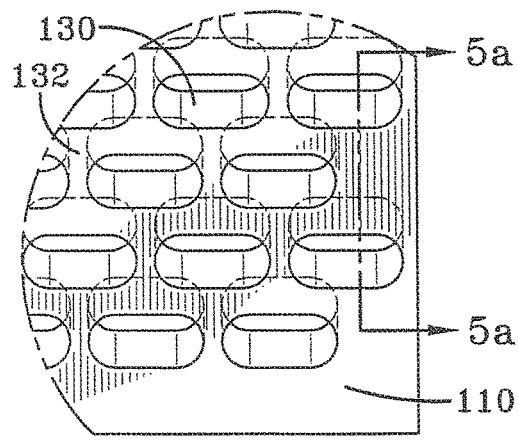
FIG. 5 is an exploded schematic view of a portion of the perforated metal or expanded metal strike face plate in accordance with an embodiment of the present invention as shown in FIG. 4.

In the alternative embodiment of the present invention, a composite layer or metal skin layer 211 may cover the perforated metal or expanded metal strike face plate 210 as shown in FIGS. 3 and 5. Composite layer or metal skin layer 211 is depicted only in the embodiment of FIG. 3 (i.e., armor system 200), but it should be appreciated that composite layer or metal skin layer 211 may be employed with the embodiment of the present invention as shown in FIG. 2 as well (i.e., armor system 100). It should also be appreciated that composite layer or metal skin layer 211 covers the entire front surface of strike face plate 210, but only a cut-away portion of composite layer or metal skin layer 211 is depicted in FIG. 3 for illustrative purposes only. The optional, thin metal skin layer provides reinforcement protection against any projectile effect and aids in the breakup of a projectile striking armor systems 100 or 200. The optional, thin metal skin layer also facilitates cleaning and painting of perforated metal or expanded metal strike face plate 210.

In accordance with the present invention, composite layer or metal skin layer 211 may be a material that is the same as or different from the material of strike face plate 210. As understood from FIG. 3, composite layer or metal skin layer 211 comprises a thickness that is relatively thin and is thinner than the thickness of strike face plate 210. In particular, composite layer or metal skin layer 211 can comprise a thickness in the range of from about ⅛ inch to ¼ inch.

As shown in FIGS. 2-5, strike face plate 110, 210 comprises a plurality of slotted holes 130 (230 in FIG. 3) which are set at an oblique angle relative to the vertical orientation of perforated metal or expanded metal strike face plate 110, 210. Plurality of holes 130, 230 of perforated metal or expanded metal strike face plate 110, 210 is preferably produced by a casting method or by a punching method. Alternatively, plurality of holes 130, 230 can be produced in perforated metal or expanded metal strike face plate 110, 210 via a water jet or plasma cutting method.

Figure 8:
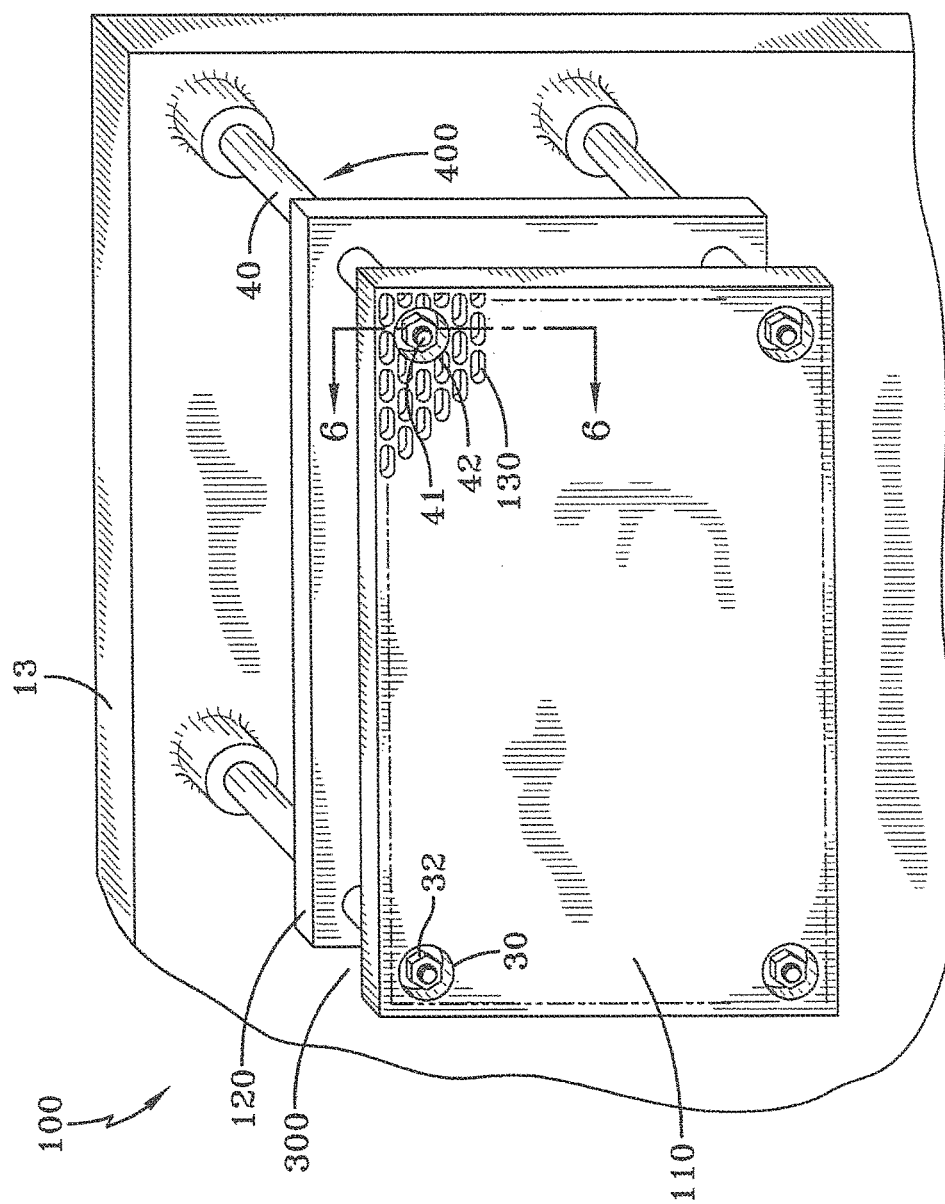
FIG. 8 is a perspective view of the strike face plate according to one embodiment of the present invention.

As shown in FIG. 6, a cutaway cross-sectional view of perforated metal or expanded metal strike face plate 110 is provided along line a-a' of FIG. 8. As depicted in FIG. 6, perforated metal or expanded metal strike face plate 110 comprises a plurality of oblique-angled holes or slots. Still referring to FIGS. 2 and 3, strike face plate 110, 210 comprises a plurality of holes or perforations 130, 230. As shown in FIG. 4, plurality of holes 130 is uniformly distributed along the entire front face of strike face plate 110. Holes 130, 230 may comprise any configuration conventional in the art, such as but not limited to circular, rectangular, oblong, rectangular or of any polygon shape (or different shapes), or any combination thereof, and can be created in the solid plate by any mechanism conventional in the art, such as punching, casting, water jet or plasma cutting. Plurality of holes 130, 230 may be perpendicular to or provided at any angle relative to the front surface of strike face plate 110, 210. Plurality of holes 130, 230 may be arranged in a repetitive manner in two planes that form webs 132 (FIG. 5) whose width and thicknesses can be varied as necessary, but are uniformly distributed throughout. Perforated metal or expanded metal strike face 110, 210 and laminate composite backing 120, 220 may be flat, bent or formed into compound angles.

Figures 5A, 5B:
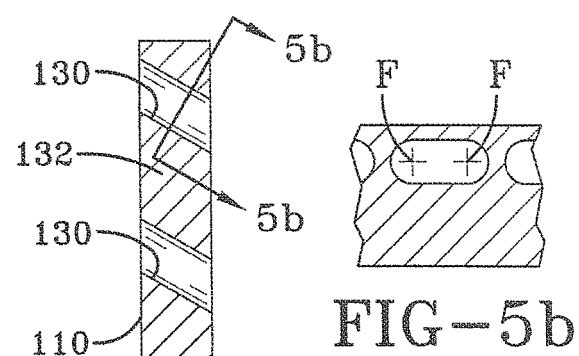
FIG. 5A is a cross-sectional view of a portion of the perforated metal or expanded metal strike face plate in accordance with an embodiment of the present invention taken in the direction 5A-5A in FIG. 5.
FIG. 5B is a schematic view of a portion of the perforated metal or expanded metal strike face plate in accordance with an embodiment of the present invention taken in the direction B-B in FIG. 5.

The sizes of the slots which may be used in the present invention range from about 0.50 inches to about 2 inches in length by about 0.25 inches to about 1 inch in width. The web 132, defined as the solid material between the plurality of slots or holes 130, 230, can vary in thickness from about 0.10 inches to 1 inch. The number of slots, for example, per square foot, may be within the range of about 15 to 680 slots/square foot. This number, however, may be left for the skilled artisan to determine depending on the nature of the particular application with which the present invention is employed. Slots or holes 130, 230 are preferably arranged in a uniformed fashion and are equally spaced apart from each other. Moreover, the slots of the present invention are set in obliquity of up to about 60 degrees, such as from 0 degrees to 50 degrees measured from a vertical orientation or axis. For example, plurality of holes that are designed for use with protecting against 30 caliber bullets would be approximately half the size of the plurality of holes that are designed for use with protecting against 50 caliber bullets. In a particular embodiment in accordance with the present invention in which holes comprise a substantially oval-shaped configuration defined by two opposing arced ends, the distance between the respective focal points (shown by opposing "F's") of the opposing arced ends is about ½ inch and the angle of each opposing arced end is about 0.17-0.19°, in particular about 0.1875° (FIGS. 5A, 5B) with each hole angled at about 20°-30° relative to the vertical orientation of the present invention, and more particularly at about 25° relative to the vertical orientation of the present invention. It should also be appreciated that the number, size, arrangement, angle, and the like of the holes employed in accordance with the present invention may depend on the use of perforated metal or expanded metal for the strike face plate, and which may be left for the skilled artisan to determine depending on the nature of the particular application with which the present invention is employed.

EXAMPLE

The armor of the present invention may be produced and represented by the following: Styrofoam master sheets having a thickness of about 0.50 inches and dimensions of about 14 inches by about 30 inches are used. The styrofoam sheets have slots in a regular pattern produced from a die and the slots have the dimensions of 0.625 inches by 1.625 inches on 0.625 inch vertical centers and 1.625 inch horizontal centers. These slots are set at an obliquity of 30 degrees relative to a vertical orientation or axis. The web, defined as the solid material between the slots, is about 0.150 inches in thickness.

As shown in FIGS. 2 and 3, plurality of holes 130, 230 are provided in a pattern referred to as the "historic" pattern. It should be appreciated that any pattern of plurality of holes 130, 230 conventional in the art may be employed in accordance with the present invention. For example, in a particular embodiment of the present invention, plurality of holes 130, 230 can be provided in a non-homogenous cross-sectional pattern.

With specific reference to FIG. 7, an alternative embodiment of the perforated metal or expanded metal strike face plate 210 of the present invention having thin metal skin 211 over the facing of perforated metal or expanded metal strike face plate 210 is provided. Plurality of holes 230 is shown having an oblique-angled configuration relative to a vertical orientation or axis. In particular, plurality of holes 230 may comprise an oblique-angle configuration of about between 20°-60° relative to the vertical orientation of the strike face plate 210. More particularly, plurality of holes 230 may comprise an oblique-angle configuration of about 25° relative to the vertical orientation of the strike face plate 210. Onto composite layer or metal skin layer 211, a further optional hard surface material 212 can be placed. The additional hard faced material 212 may be composed of carbon cloth, tungsten carbide particles, FeCr coating, FeCr-/Mo/V surfacing, 1642 CrC surfacing or Ceramo $Cr_7Cr_3$ surfacing and can be employed to provide an additional protective layer. The hard faced material may be sintered to the thin composite layer or metal skin layer 211 during the casting process and aids in the breakup of a high caliber projectile.

With reference to FIGS. 2 and 3, armor system 100, 200 further comprises laminate composite backing 120 (220 in FIG. 3). Laminate composite backing 120, 220 can comprise a cross-sectional composition of fibers such as, but not limited to, at least one of a synthetic aramid fibers or para-aramid fibers known as KEVLAR® fibers, E-glass, S-Glass, Ultrahigh Molecular Weight Polyethylene (UHMWPE), including fibrous UHMWPE such as a pressed SPECTRA SHIELD II® SR-3130 ballistic composite material from Honeywell Advanced Fibers and Composites, Colonial Heights, Va., and integrally combined with polymer resin-based binders such as, but not limited to, at least one of silicones, epoxies, urethanes, polyethylenes, polyurethanes, and polyureas, such as those disclosed in U.S. Pat. Nos. 6,638,572 and 7,098,275 (both to Inglefield and commented on earlier), incorporated herein by reference in their entireties. In accordance with the present invention, polymer resin-based binders such as, but not limited to, at least one of silicones, epoxies, urethanes, polyethylenes, polyurethanes, and polyureas may be those sold under the trademark HOTBLOX® which may be readily obtained from American Technical Coatings, Inc. located in Cleveland, Ohio. In accordance with the present invention, laminate composite backing 120, 220 comprises a thickness in the range of about ¼ inch to about 5 inches, and in particular in the range of about 1-4 inches. More particularly, laminate composite backing 200 comprises a thickness of about 2.5 inches. It should be appreciated, however, that the particular thickness of the laminate composite backing depends on the particular type of application with which the present invention is used. For example, use of the laminate composite backing in an armor system according to the present invention would be comparatively thinner for use with body armor than for use with, for example, an armor system for protecting vehicles or missile transport canisters.

In accordance with the preferred embodiments of the present invention, laminate composite backing 120, 220 can comprise a layered configuration of cross-sectional composition of fibers such as, but not limited to, at least one of synthetic aramid fibers or para-aramid fibers known as KEVLAR® fibers, E-glass, S-Glass, Ultrahigh Molecular Weight Polyethylene (UHMWPE), such as a plurality of layers of standard ballistic cloth based on a UHMWPE known under the trademark DYNEEMA®, and integrally combined with polymer resin-based binders such as, but not limited to, at least one of silicones, epoxies, urethanes, polyethylenes, polyurethanes, and polyureas, such as those disclosed in U.S. Pat. Nos. 6,638,572 and 7,098,275 (both to Inglefield and commented on earlier), incorporated herein by reference in their entireties. In accordance with the present invention, polymer resin-based binders such as silicones, epoxies, urethanes, polyethylenes, polyurethanes, and polyureas may be those sold under the trademark HOTBLOX® which may be readily obtained from American Technical Coatings, Inc. located in Cleveland, Ohio as discussed above. A bottom layer, side layers and a top layer of a polymer resin-based binder material such as a silicone, epoxy, polyurethane, urethane and/or polyurea, such as those sold under the trademark HOTBLOX® readily obtained from American Technical Coatings, Inc. located in Cleveland, Ohio, are provided for encasing the layered configuration comprising the laminate composite backing 120, 220. The layered configuration comprising the laminate composite backing 120, 220 is treated under pressure, such as in the range of about 2,000 psi-3,500 psi for a period of time as needed, such as in the range of between ½ hour-10 hours, and preferably in the range between 1-5 hours, to arrive at an appropriate laminate composite backing for use with the protective system of the present invention.

It should be appreciated that the process for forming the laminate composite backing layer in accordance with the present invention can be as follows. It should also be appreciated that the process for forming the laminate composite backing layer in accordance with the present invention would envision any alternative or modifications that would be apparent to one skilled in the art. In particular, a material in a liquid form is encapsulated around a fibrous bundle core in a manner conventional in the art. The liquid is solidified to form an encapsulating skin. The transformation from liquid may occur, for example, via solvent evaporation, chemical reaction, or cooling from a molten state or by any alternative comparable manner conventional in the art. For example, a two-component system which is liquid under normal ambient conditions without the addition of a solvent can be poured over the fibrous bundle core and the components solidify by a chemical reaction. Alternatively, a thermoplastic material can be melted and molded around the fibrous bundle core, i.e., by insert injection molding.

Regardless of the actual chemistry of the resin material, the preferred material properties of the resultant solidified encapsulating skin for the laminate composite backing in accordance with the present invention can be the following. In particular, thermoset elastomeric resins may be employed in accordance with the present invention as follows.

Hardness, via ASTM D 2240: Shore 60A-60D, preferably 75A-55D;

Ultimate Tensile Strength (psi), via ASTM D 412: 1200-9000 psi, preferably 3000-8000 psi;

Modulus at 100% elongation (psi), via ASTM D412: 400-2200 psi, preferably 700-1500 psi;

Modulus at 300% elongation (psi), via ASTM D412: 700-5000 psi, preferably 900-4000;

Elongation-to-break (%), via ASTM D412: 150-1000, preferably 300-800.

EXAMPLE

An example of the formulation in accordance with the present invention can be as follows. It should be appreciated that the formation of the present invention is not limited to this example, but would envisions any alternatives or modifications that would be understood by one skilled in the art. A polyurethane that is made by the reaction of a multifunctional amine and a multifunctional isocyanate without the addition of a solvent is provided. More specifically, an oligomeric ether or ester with diamine functionality reacted with a diisocyanate is provided.

In an alternative embodiment, as discussed in greater detail below, a layer, sheet or board of a high tensile strength material, such as a high tensile strength urethane board, may be employed adjacent to laminate composite backing 200 at a thickness in the range of about ⅛ inch-4 inches, and more particularly at a thickness in the range of about ¼ inch-4 inches. It should be appreciated that the thickness of the high tensile strength urethane board would depend on the specific requirements of the particular application with which the present invention is employed. High tensile strength urethane board may supplement the laminate composite backing 200, or replace at least a portion of the cross-sectional composition of the laminate composite backing 200.

As shown in a first embodiment of FIG. 2, armor system 100 is provided with the strike face plate 110 and laminate composite backing 120 bonded together by bonding methods conventional in the art, such as by a urethane or polyurethane bonding. As shown in FIG. 2, strike face plate 110 and composite backing 120 are bonded directly together with no air space there between. It should be appreciated that strike face plate 110 and laminate composite backing 120 could also be secured together via mechanical means conventional in the art, as discussed further below. Such a configuration may be employed, for example, for use of the present invention in a body armor type of application.

Figure 3A:
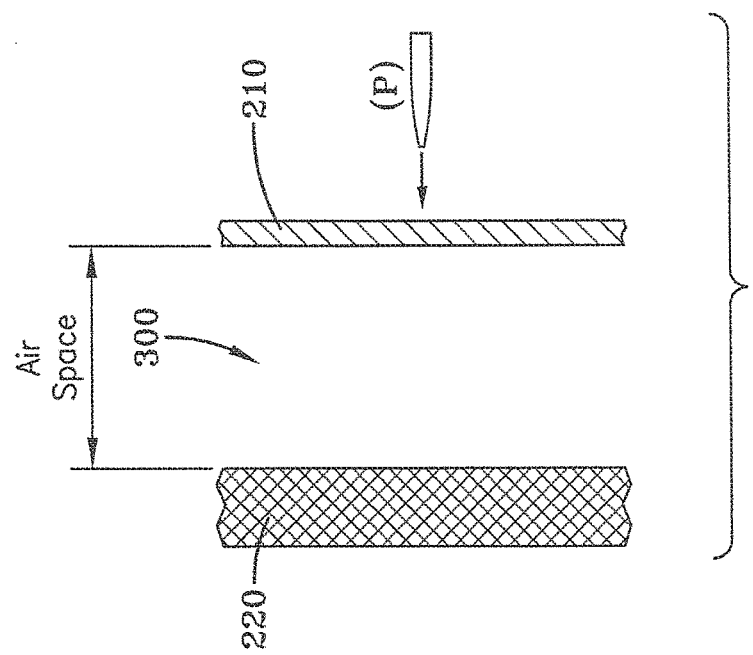
FIG. 3A is a cross-sectional view of the second embodiment of the armor system as shown in FIG. 3.
Figure 4:
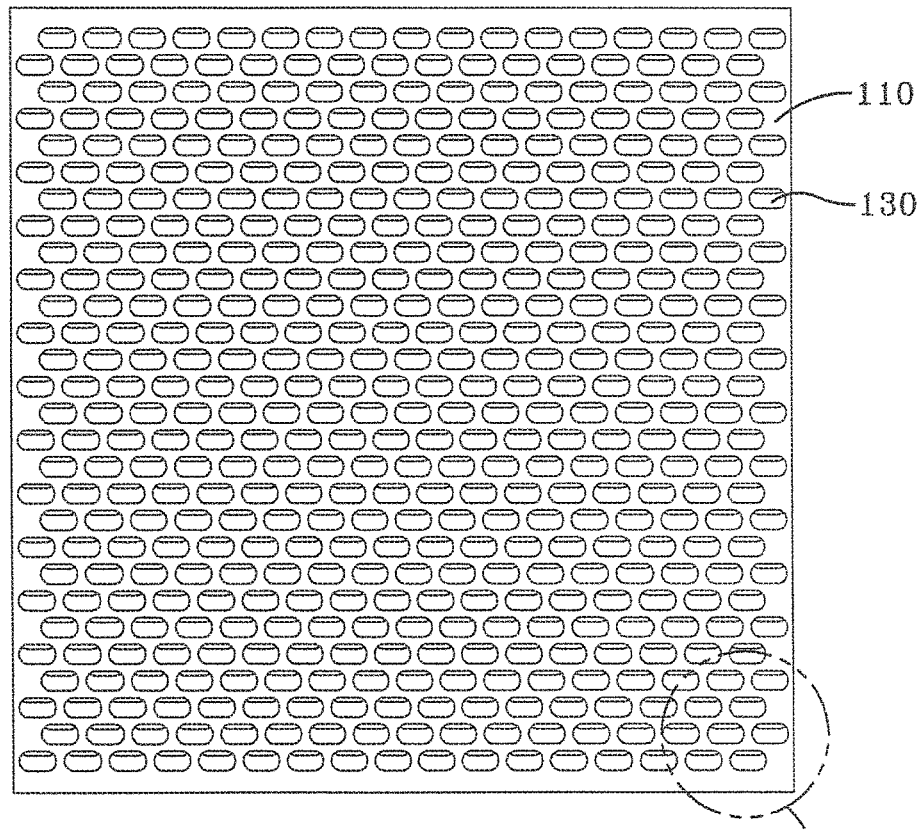
FIG. 4 is a front view of a perforated metal or expanded metal strike face plate in accordance with an embodiment of the present invention.

As shown in a second embodiment of the present invention of FIGS. 3, 3A and 3B, armor system 200 is provided with an air space 300 between strike face plate 210 and laminate composite backing 220. Air space 300 may be provided at a distance or depth in the range of about 4-6 inches. More particularly, air space 300 may be provided at a distance or depth of about 5⅛ inches to 5½ inches. It should be appreciated that the particular depth of the air space would depend on the particular type of application with which the present invention is employed, including no air space at all, i.e., air space having zero inches depth. In other words, armor system 200 would be devoid of air space 300. Air space 300 may be optionally filled with a foam energy absorbing material, such as low density foam, or other comparable energy absorbing material as conventional in the art.

Figure 9A:
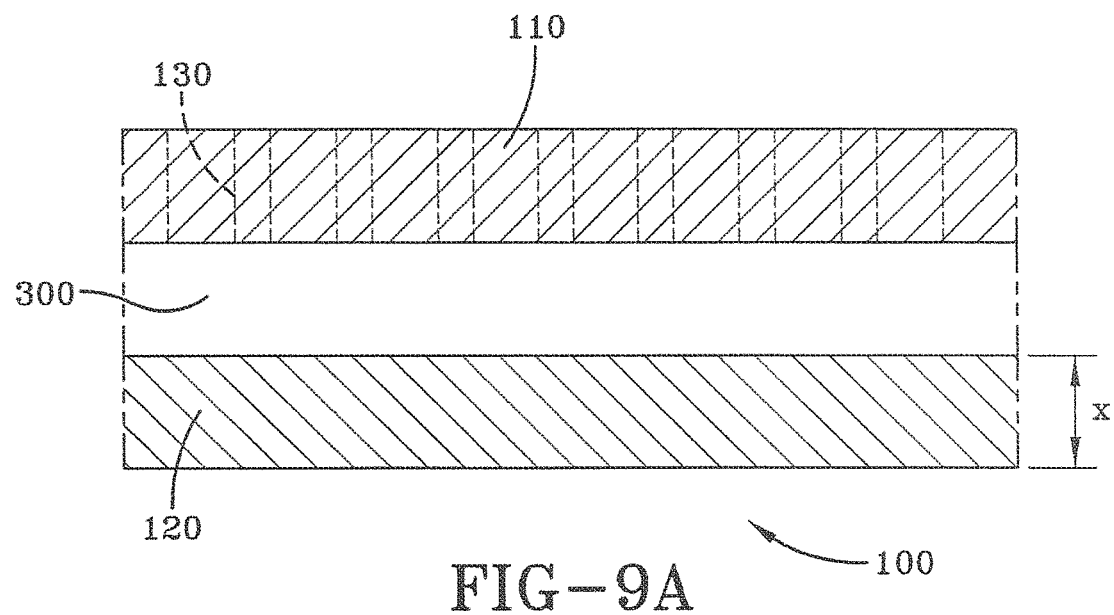
FIG. 9A is a cross-sectional view of an embodiment of the layers of the armor system according to the present invention.
Figure 9B:
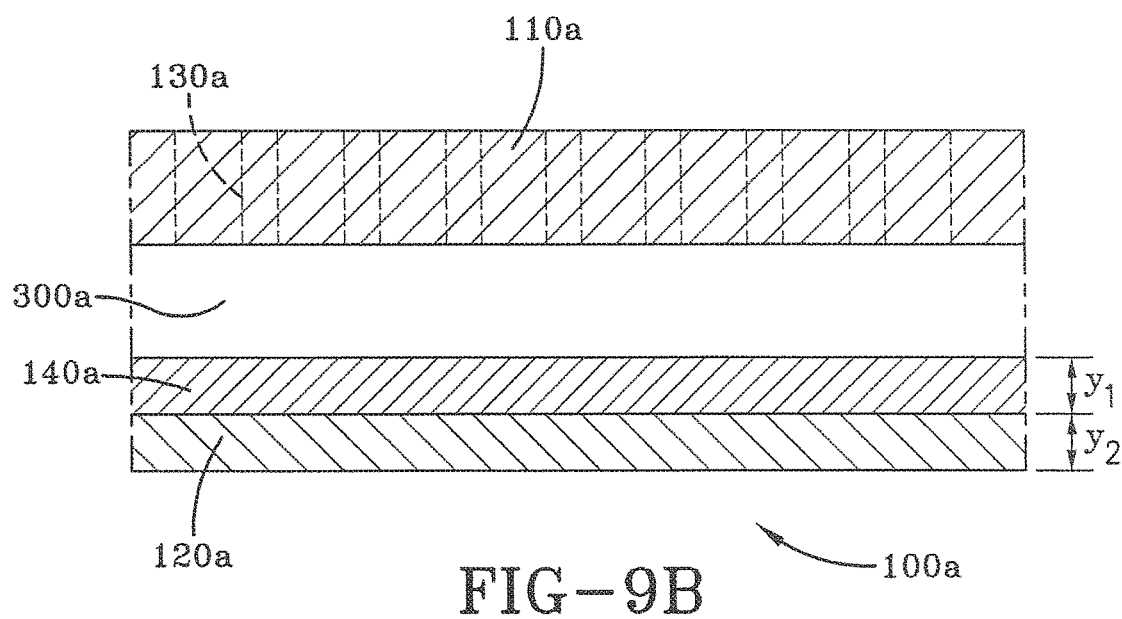
FIG. 9B is a cross-sectional view of an alternative embodiment of the layers of the armor system according to the present invention.

Turning now to FIGS. 9A and 9B, cross-sectional schematic diagrams of the present invention are shown and described. As shown in FIGS. 9A and 9B, the armor system according to the present invention may be employed for use as an armor system for missile transport canisters. With reference to FIG. 9A, armor system is shown at numeral 100 comprising perforated metal or expanded metal plate 110 having plurality of holes 130, laminate composite backing 120 and air space 300 between perforated metal or expanded metal strike face plate 110 having plurality of holes 130 and laminate composite backing 120. Laminate composite backing comprises a thickness defined as thickness X, which may be for example about 2.5 inches. With reference to FIG. 9B, an alternative embodiment of armor system is shown at numeral 100a comprising perforated metal or expanded metal plate 110a having plurality of holes 130a, laminate composite backing 120a and air space 300a between perforated metal or expanded metal plate 110a having plurality of holes 130a and laminate composite backing 120a. A sheet of material or board, shown at numeral 140a, may be provided on top of and adjacent to laminate composite backing 120a. Sheet of material or board 140a may be, but is not limited to, a high tensile strength urethane board having a defined thickness of y1. The defined thickness of laminate composite backing 120a is thus reduced as compared to the laminate composite backing 120 of FIG. 9A and is shown at numeral y2. It should be appreciated that the defined thicknesses of sheet of material or board 140a and laminate composite backing 120a (FIG. 9B) is substantially equal to the thickness of laminate composite back 120 (FIG. 9A). In other words, the defined thicknesses of y1+y2=x depending on the particular application with which the present invention is employed. It should be appreciated that sheet of material or board 140a may be employed for partially replacing a desired thickness or amount of laminate composite backing 120a for reducing overall production costs while maintaining overall system strength, thickness and integrity.

In accordance with the present invention, the armor system of the present invention meets the appropriate military weight specifications and requirements for defeating high velocity and high caliber projectiles. In particular, the armor system of the present invention meets the appropriate military weight specifications and requirements as defined by NATO Standardization Agreement (STANAG) Bullet Impact, Munitions Test Procedures promulgated on Apr. 15, 2003 and NATO Standardization Agreement (STANAG) Fragment Impact, Munitions Test Procedures promulgated on Dec. 13, 2006, both of which are incorporated herein by reference in their entireties. For example, the present invention meets the appropriate test of stopping three (3) 50-caliber bullets shot within a 2-inch diameter area and shot in a time interval of 1/10 second apart.

In accordance with the present invention, the armor system of the present invention comprises a weight in the range of about 18-30 pounds/ft$^2$ for use with missile canister protection systems. More particularly, in accordance with the present invention, the armor system comprises a weight of no greater than about 26 pounds/ft$^2$ in the embodiment in which the present invention is employed for use with a missile canister armor system. Even more particularly, in accordance with the present invention, the armor system comprises a weight of about 23 pounds/ft$^2$ in the embodiment in which the present invention is employed for use with a missile canister armor system. In accordance with the present invention, the respective weights meet those that are needed by the particular application of use with which the present invention is employed.

As shown in FIG. 3, a mechanical attachment mechanism 400 can be fabricated into the components 110 and 120 for attaching components 110 and 120 to each other and/or for attaching an armor system to another object to be protected, such as a vehicle, and which is employed with the specific application of use. For example, referring to FIGS. 6-8, strike face plate 110 comprises recessed pockets 42 through which tubular spacers 40, each having a threaded end 41 passes through. Strike face plate 110 is attached to a structure 13 to be protected (e.g., a vehicle) (FIG. 8) through tubular spacers 40 by a washer 30 and nut 32. As shown in FIG. 6, strike face plate 110 comprises an opening 45 through which tubular spacer 40 may be accommodated. In a preferred embodiment, mechanical attachment mechanism 400 may be a conventional threaded screw and nut engagement mechanism as known in the art.

Turning now to FIGS. 10-14, the use of the armor system in accordance with the present invention in connection with a particular type of application will be shown and described, namely for use with an armor system for the transport of missile canisters. It should be appreciated, however, that the specific application of the present invention shown in FIGS. 10-14 is for illustrative purposes only and the armor system of the present invention should not be considered limited or exclusive to such an application or use.

Figure 11:
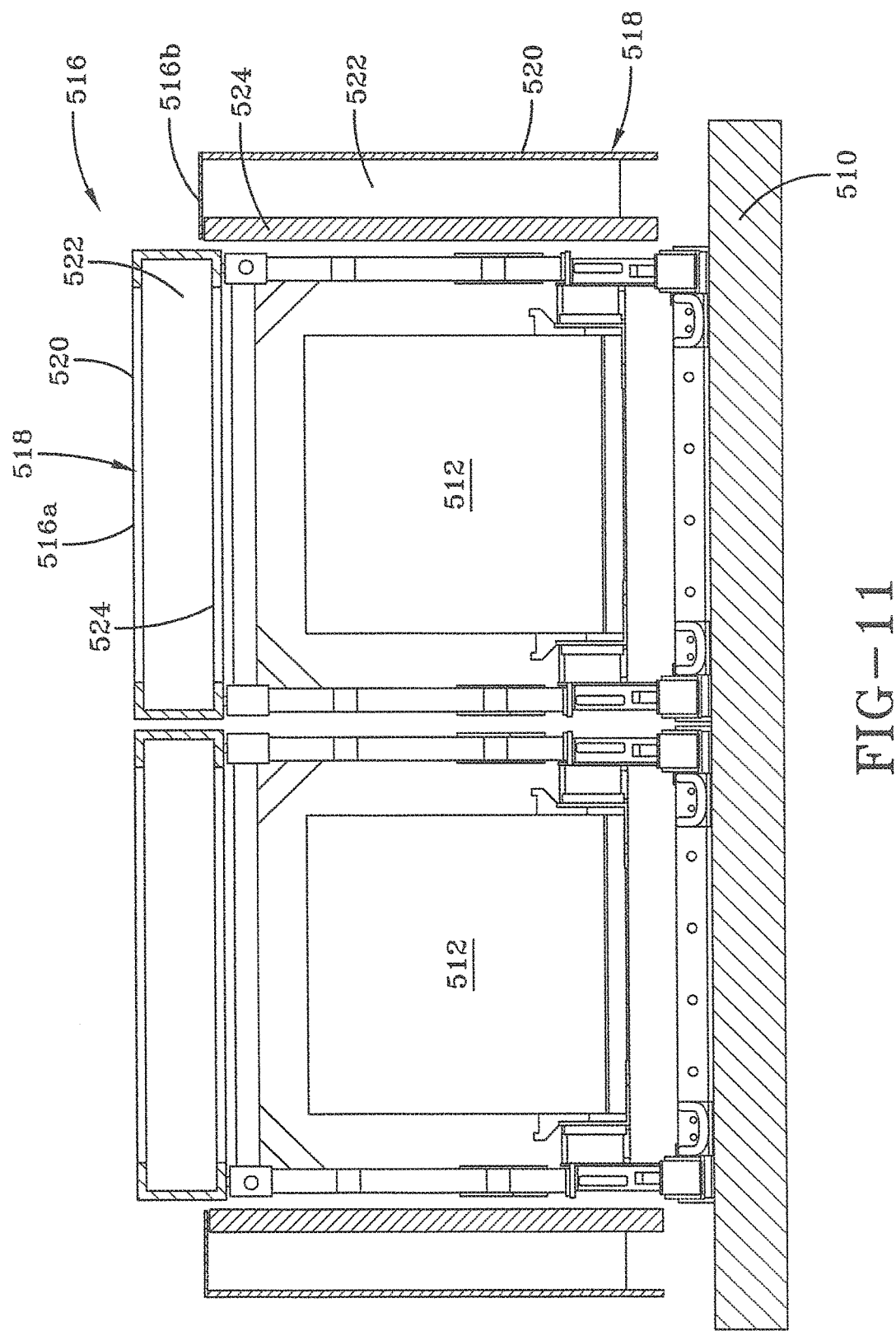
FIG. 11 is a rear view of the armor system according to the present invention in an example application of use as shown in FIG. 10.

As shown in FIG. 10, the armor system is shown generally at numeral 500. A flatbed truck trailer 510 is provided for carrying at least one missile canister 512. As shown in FIG. 10, four missile canisters 512 are provided on flatbed truck trailer 510. A frame 514, such as a wooden or metal frame as known in the art, is provided for securing each individual canister 512 to flatbed truck trailer 510. Spacers 534, such as wood spacers or metal spacers, are provided on the floor of the flatbed truck trailer 510 to further ensure stability of canisters 512 (FIG. 13). An additional frame system 516, such as an aluminum frame system (FIG. 11) having a top frame 516a and side frames 516b, is provided for securing the armor system panels 518 to the side of the flatbed truck trailer 510 and totally surrounding the canisters 512 secured by frame 514. It should be appreciated that any comparable material to aluminum may be employed for frame system 516. As shown in FIG. 11, each segment of frame system 516 contains or houses strike face plate 520 and laminate composite backing 524, with air space 522 therebetween, and regardless of whether the respective segment of frame system 516 is employed on aside, front, top or back of the trailer bed 510. Each segment of frame system 516 is employed in series so as to directly and securely abut the respective adjacent segment of frame system 516 to form a secure protective system in all directions surrounding the canisters 512, including top and all sides.

Referring to FIG. 12, top frame 516a and side frames 516b of frame system 516 are secured to together via a mechanical locking mechanism. The mechanical locking mechanism comprises a plurality of upwardly angled hooks, forks or the like 530 on top frame 516a which secure into and lock with corresponding grooves, holes, pockets or the like on side frames 516b. Side frames 516b are directly secured to each armor system panel 518, such as via conventional threaded bolt and nut securing mechanism or any other comparable mechanism conventional in the art. Straps 536 (FIG. 14) may be employed to further stabilize canisters 512 in place on flatbed truck trailer 510.

Examples—Ballistic Testing

The Ballistic Barrier Test was conducted in order to test ballistic armored panels in accordance with the present invention.

STANAG 4241-.50 Caliber Bullet Impact Test

The objective of the test was to impact each candidate plate in a specified quadrant with a volley of three 0.50-caliber armor-piercing (AP) projectiles, fired at 100+/−8 msec intervals from 0.50 caliber Mann barrel devices. The projectiles were required to have velocities of 2788+/−66 ft/sec. These projectiles were to impact the specified plate quadrant within a 2-in circle, without key-holing or overlapping.

Test Item Configuration

Figure 15:
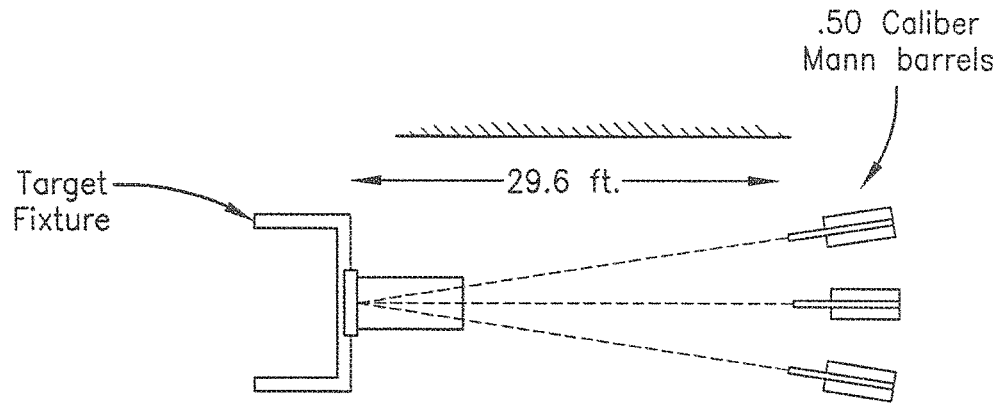
FIG. 15 is a schematic drawing of a test configuration of the present invention.

The overall general test configuration is shown in FIG. 15 and is discussed in greater detail below.

Figure 16:
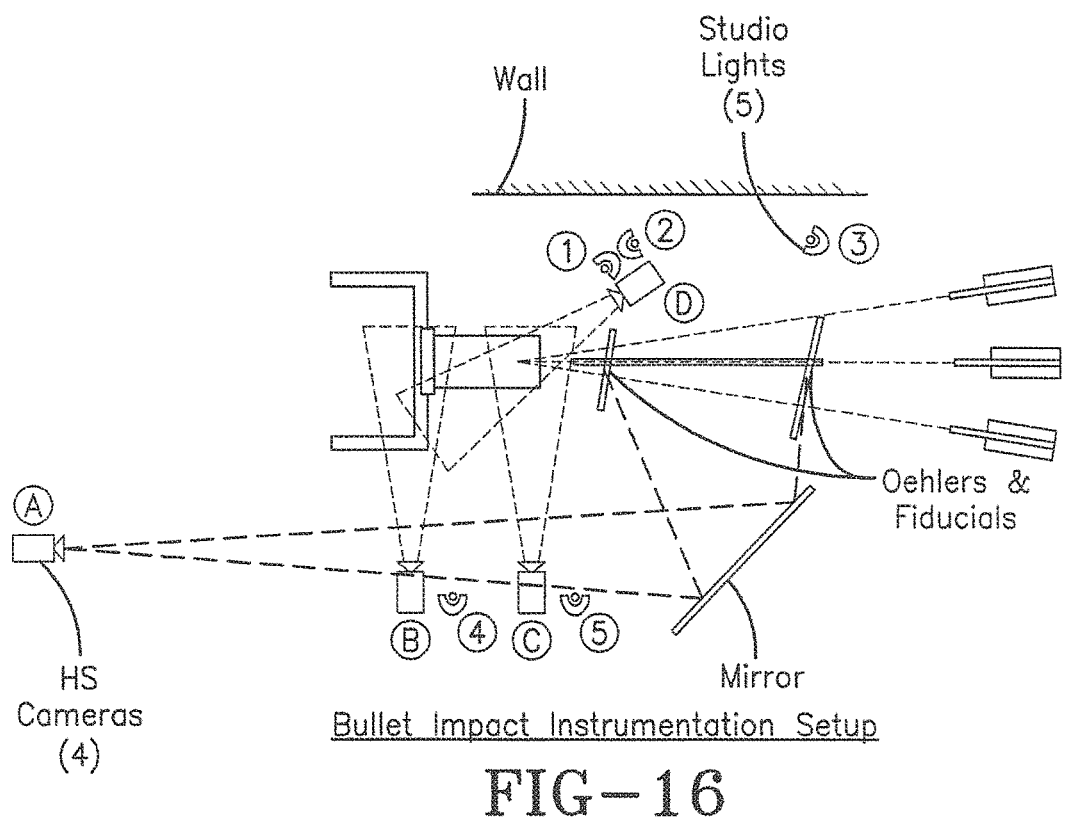
FIG. 16 is a schematic drawing of a bullet impact instrumentation configuration of the present invention.

The instrumentation setup was as shown in FIG. 16. A total of four Phantom cameras were used, and are described in Table 1 below.

TABLE 1

BULLET IMPACT TEST CAMERA SPECIFICATIONS

| Camera | Type | Frame Rate | Resolution | Exposure Time | Purpose |
|---|---|---|---|---|---|
| A | Phantom 710 | 5,000 frames/s | 1280 × 308 | 20 μs | Projectile Velocity |
| B | Phantom 7.3 | 6,400 frames/s | 800 × 600 | 3-10 μs* | Witness Plate |
| C | Phantom 7.3 | 6,400 frames/s | 800 × 600 | 3-10 μs* | Target Front/Rear Face |
| D | Phantom 7.3 | 6,400 frames/s | 800 × 600 | 3-10 μs* | Target Front Face |

*Adjusted for lighting conditions

Figure 17:
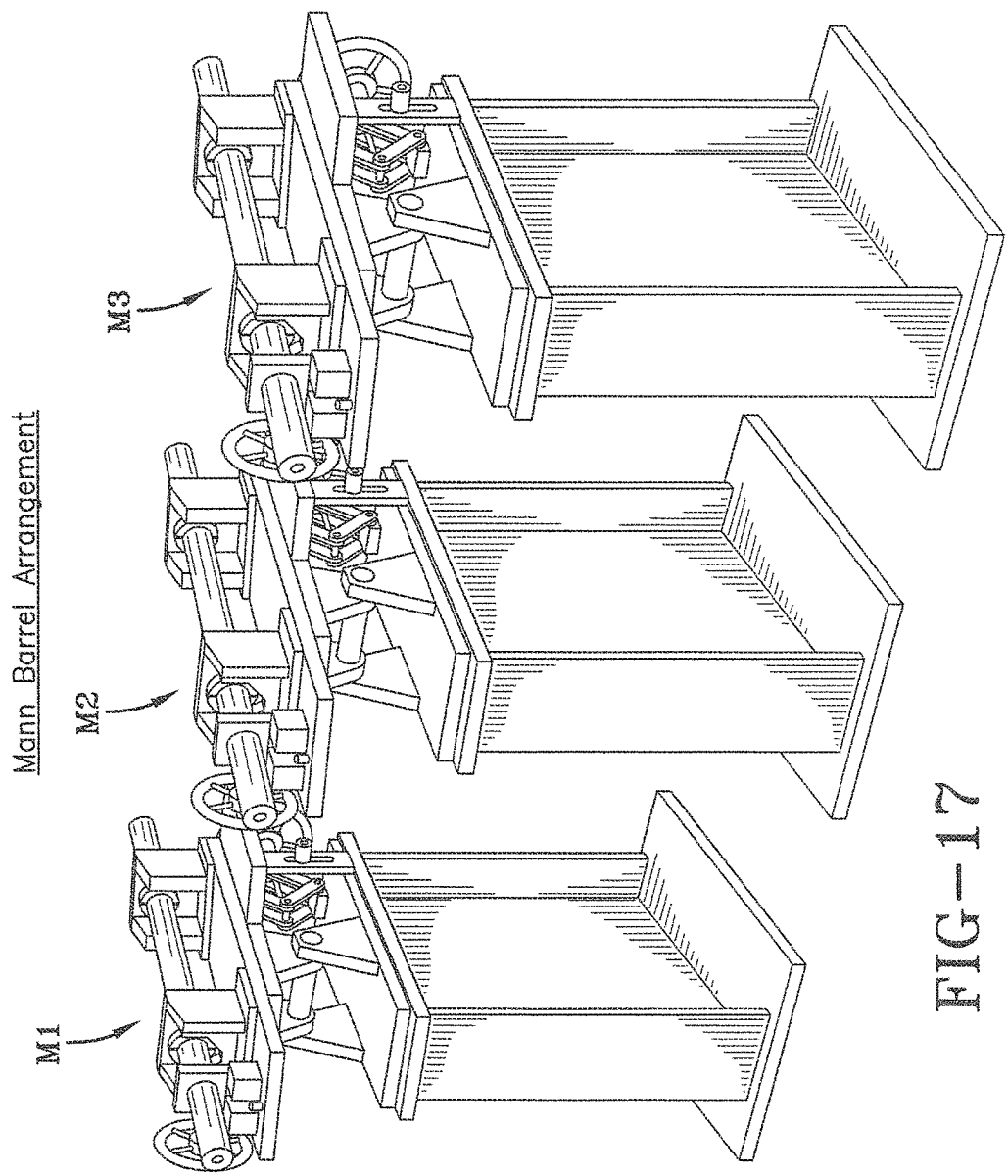
FIG. 17 is a schematic drawing of the gun barrel arrangement of the test configuration of the present invention.

FIG. 17 depicts the three Mann barrels (M1, M2 and M3) used in the testing of the present invention. The center muzzle distance to the target plate was approximately 29.6 feet. The guns were sequenced to fire at 100 msec intervals.

Figure 18:
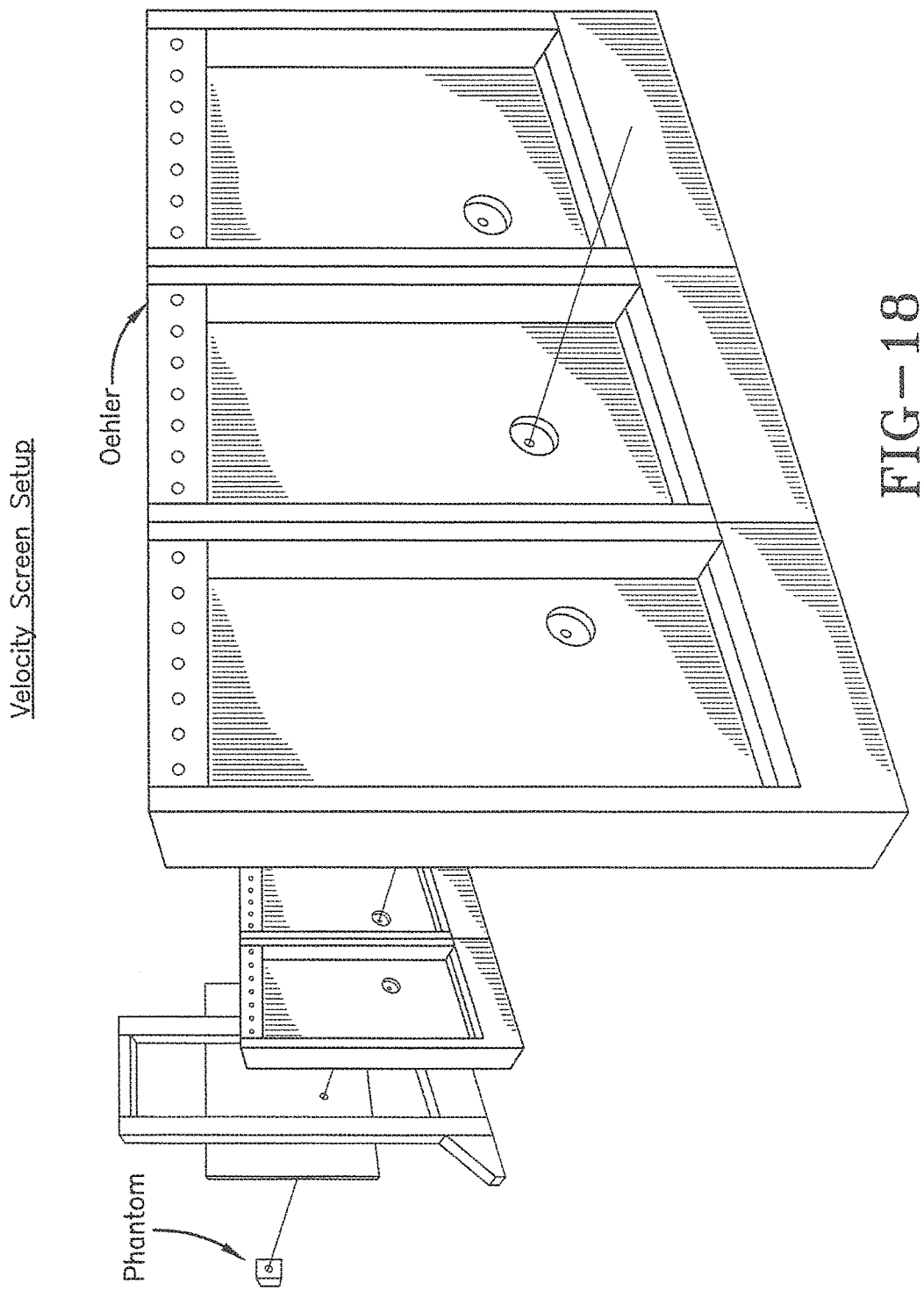
FIG. 18 is a schematic drawing of the velocity screen arrangement of the test configuration of the present invention.

Projectile velocities were measured using Oehler infrared screens and high-speed video. The Oehler screen and Phantom high-speed camera setup was as shown in FIG. 18.

Test Execution

Figure 19:
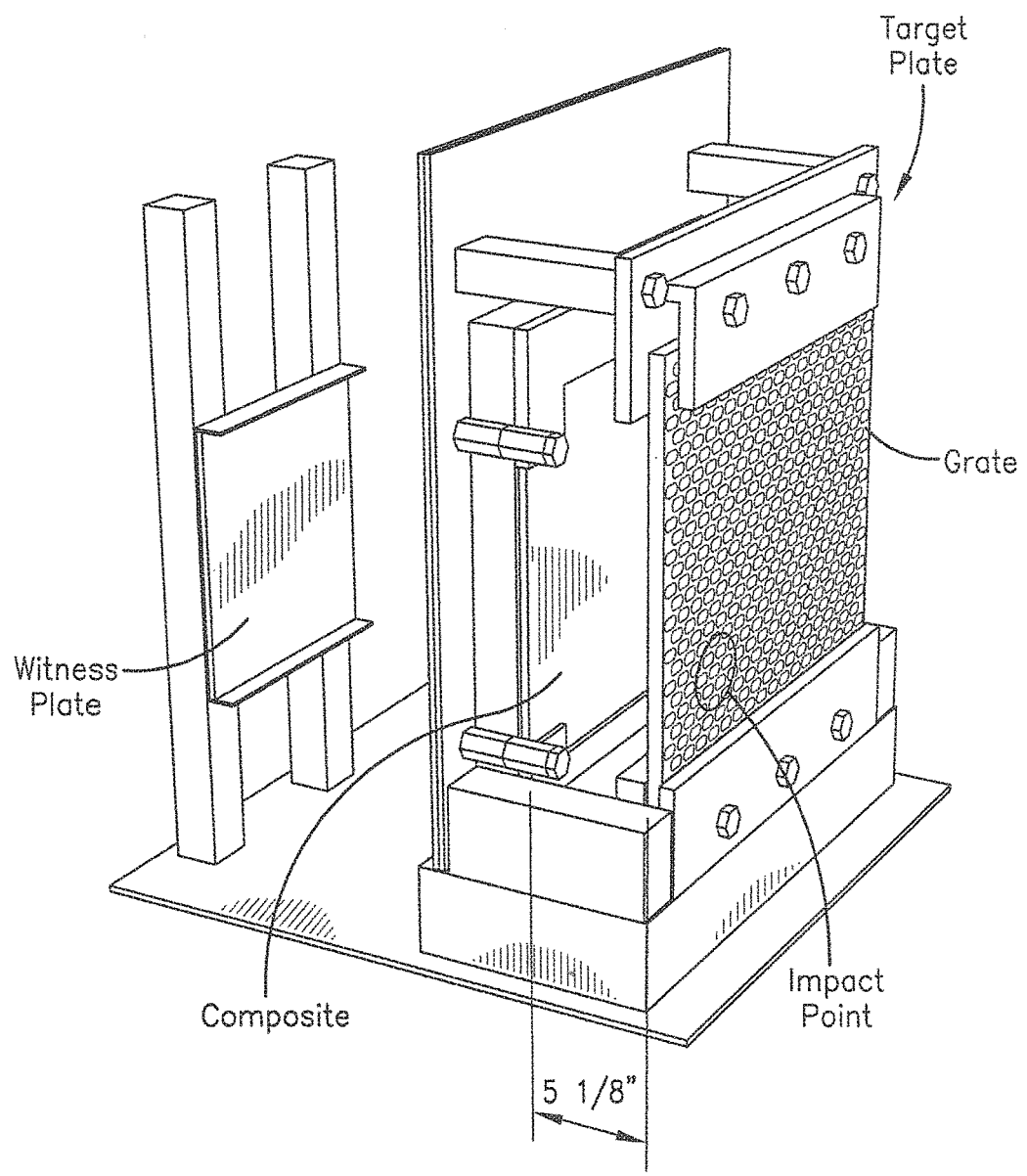
FIG. 19 is a perspective schematic drawing of the plate arrangement of the test configuration of the present invention.

Once the equipment was verified to be fully functional, and the projectile grouping was within a 2-inch circle, the target plate was secured to the test stand. The target plate consisted of a ⅝-inch perforated grate up-range and a 2.5-inch thick piece of composite downrange. The target panels were bolted to the test stand as shown in FIG. 19. The distance from the perforated plate to the composite plate was approximately 5⅛-inches.

Three laser bore-sights were used to give an approximate visual reference as to where the Mann barrels were aimed. The point of impact was on the face of the perforated metal grate at the center of the lower-left quadrant as demonstrated in FIG. 19.

Figure 20:
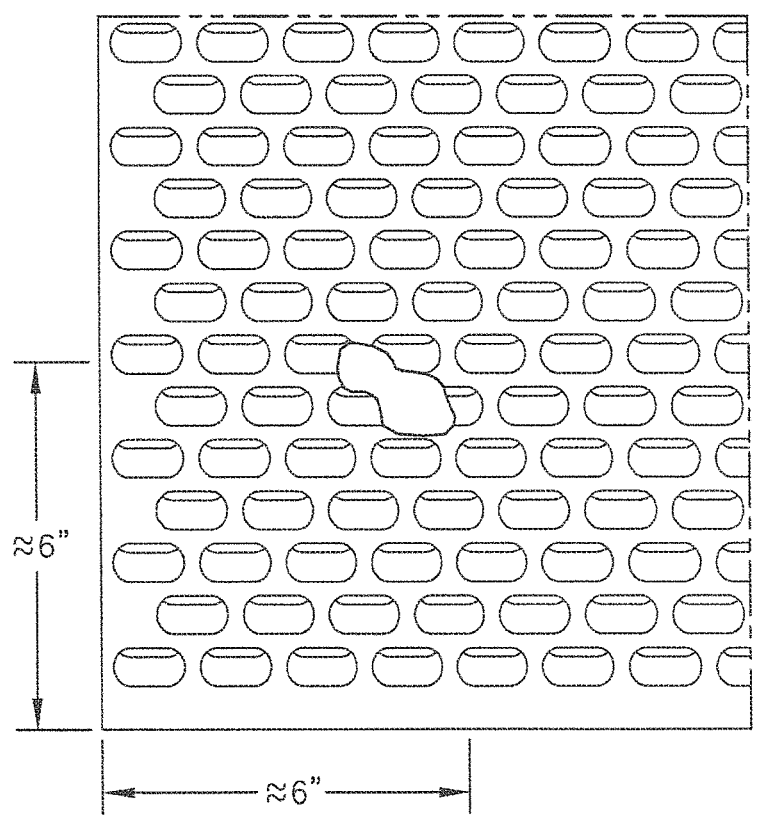
FIG. 20 is a schematic drawing of the plate projectile impact locations of the test configuration of the present invention.

Once the instrumentation was reset and shown to be ready, a volley of three .50 caliber armor-piercing projectiles was fired at the target. The projectiles impacted the plate within a 2-inch circle as shown in FIG. 20. The aim point was approximately 6 inches from the left side of the grate and approximately 6 inches from the bottom of the grate.

Figure 21:
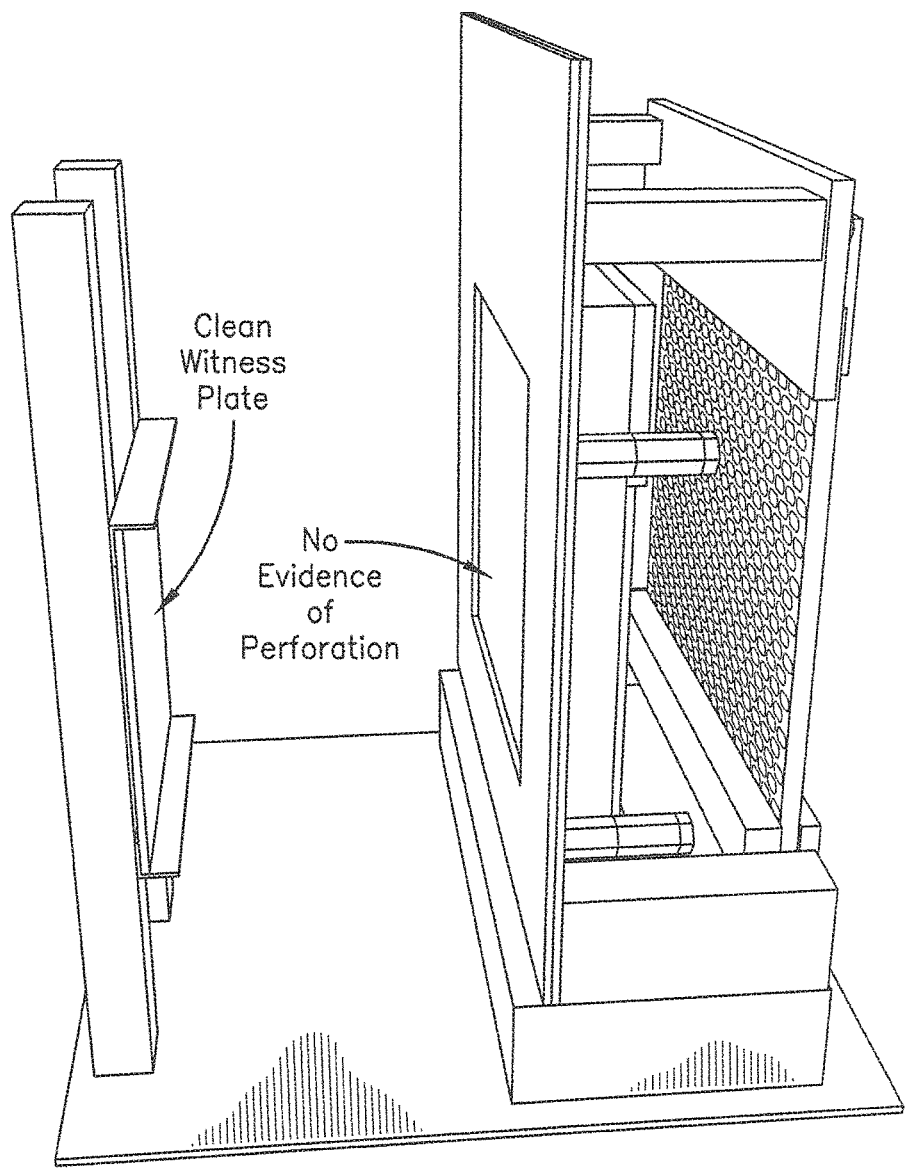
FIG. 21 is a schematic drawing of the post-test plate condition of the test configuration of the present invention.

As shown in FIG. 21, the test panel according to the present invention prevented all three projectiles from impacting the witness plate.

Velocity data for this volley is shown in Table 2 below.

TABLE 2

PROJECTILE VELOCITY & INTERVAL DATA

| | Oehler [ft/s] | Phantom [ft/s] | Projectile Weight [grains] | ΔTime from HS video [ms] |
|---|---|---|---|---|
| 1 | 2812 | 2826 | 693 | N/A |
| 2 | 2797 | 2811 | 693 | 101 |
| 3 | 2786 | 2791 | 693 | 98 |

Additional Test Plate

Figure 22:
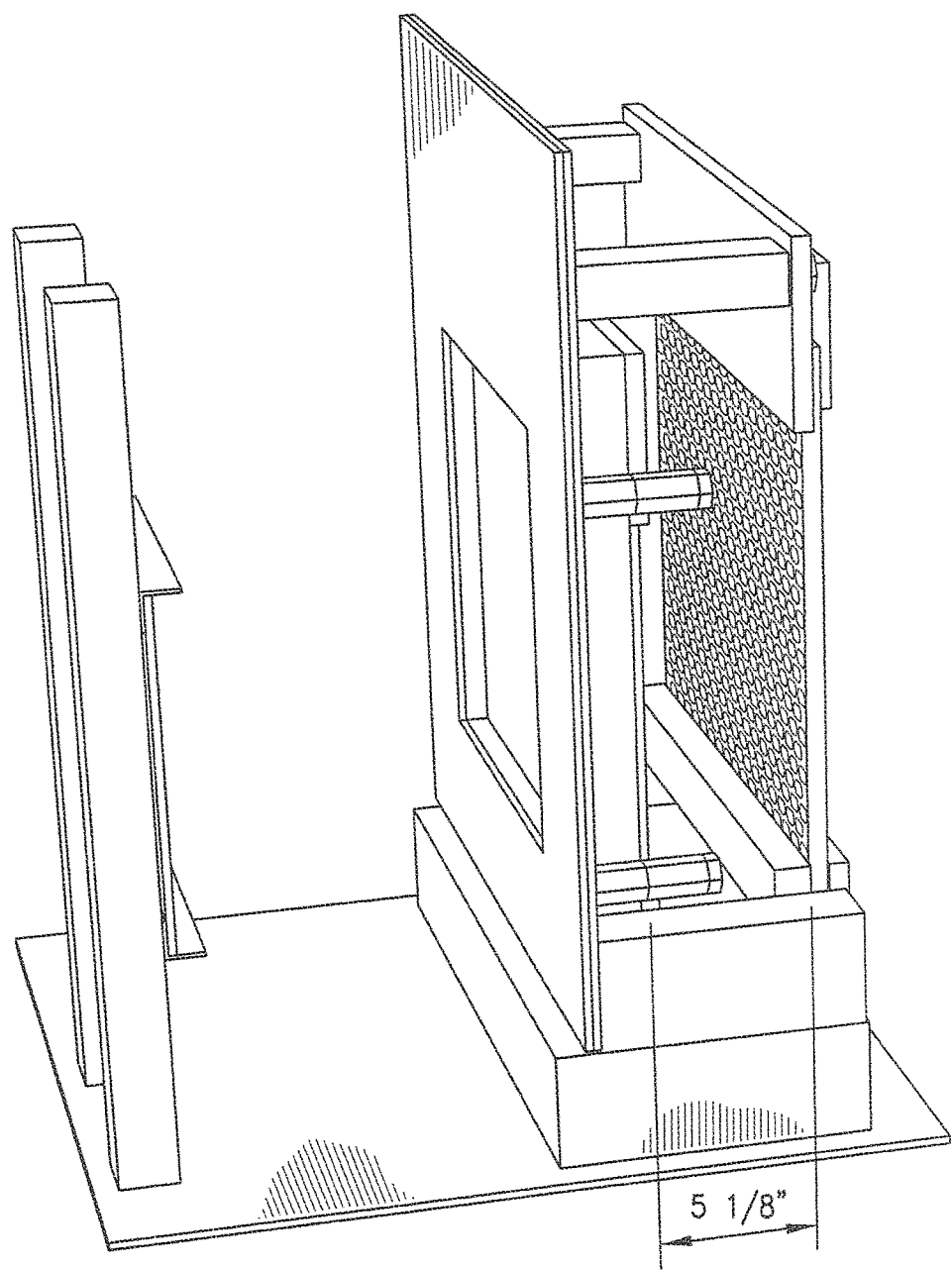
FIG. 22 is a schematic drawing of the test plate shown secured to the target stand of the test configuration of the present invention.

Another target test plate in accordance with the present invention was secured in a similar fashion as the first test plate. In this additional test, the difference between the respective plates was that the former had a composite plate thickness of 1.75 inches. This required the use of a ¾-inch standoff directly behind and downrange of the composite plate in order to maintain a plate separation of 5⅛-inches as shown in FIG. 22.

Figure 23:
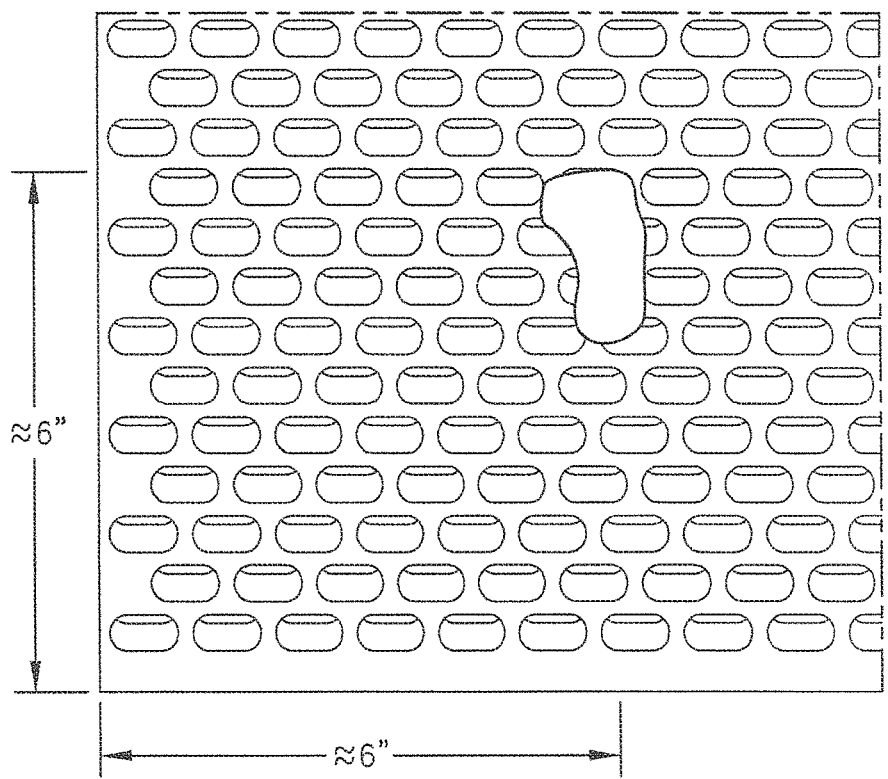
FIG. 23 is a schematic drawing of the projectile impact locations of the test configuration of the present invention.

A volley of three .50 caliber AP projectiles was fired at the target. Upon post-test inspection it was observed that projectile grouping and impact locations were similar to the initial test results as shown in FIG. 23.

Figure 24:
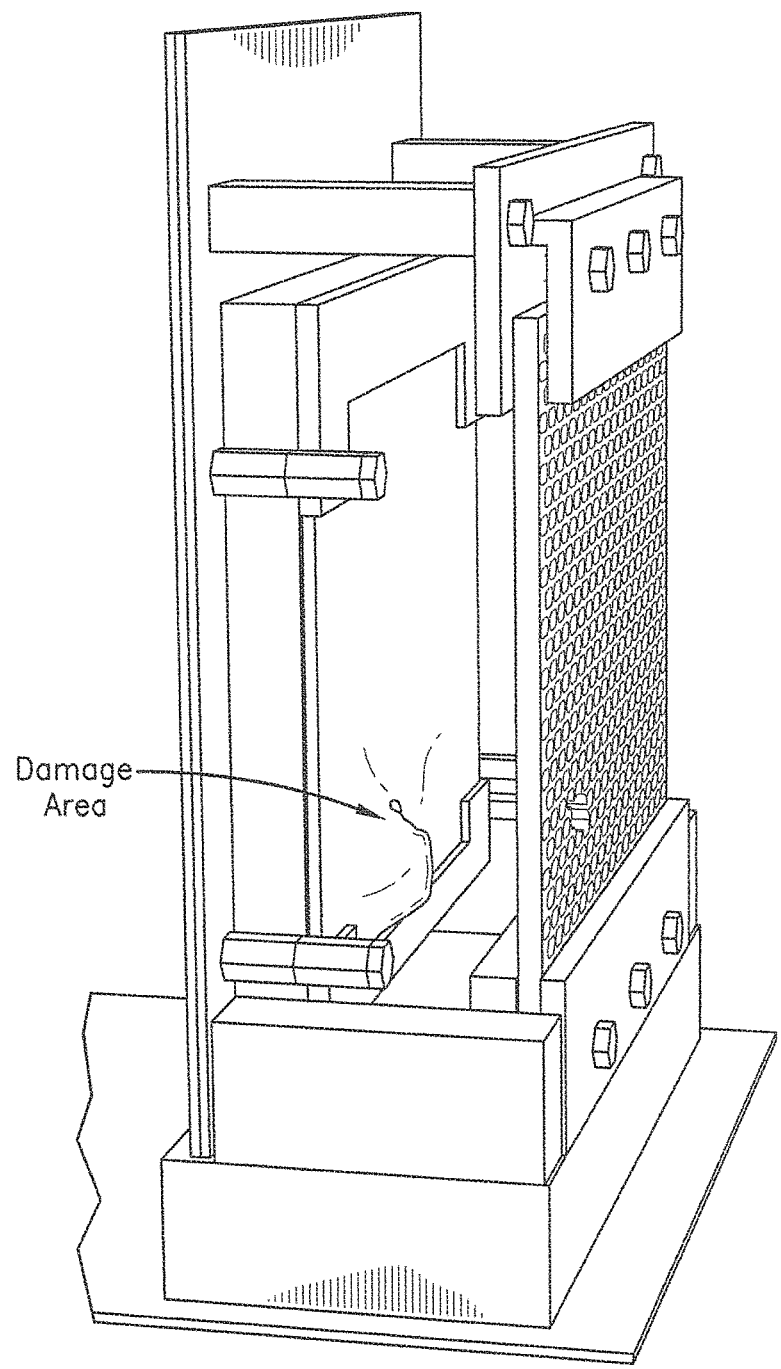
FIG. 24 is a schematic drawing of the post-test plate condition of the test configuration of the present invention.
Figure 25:
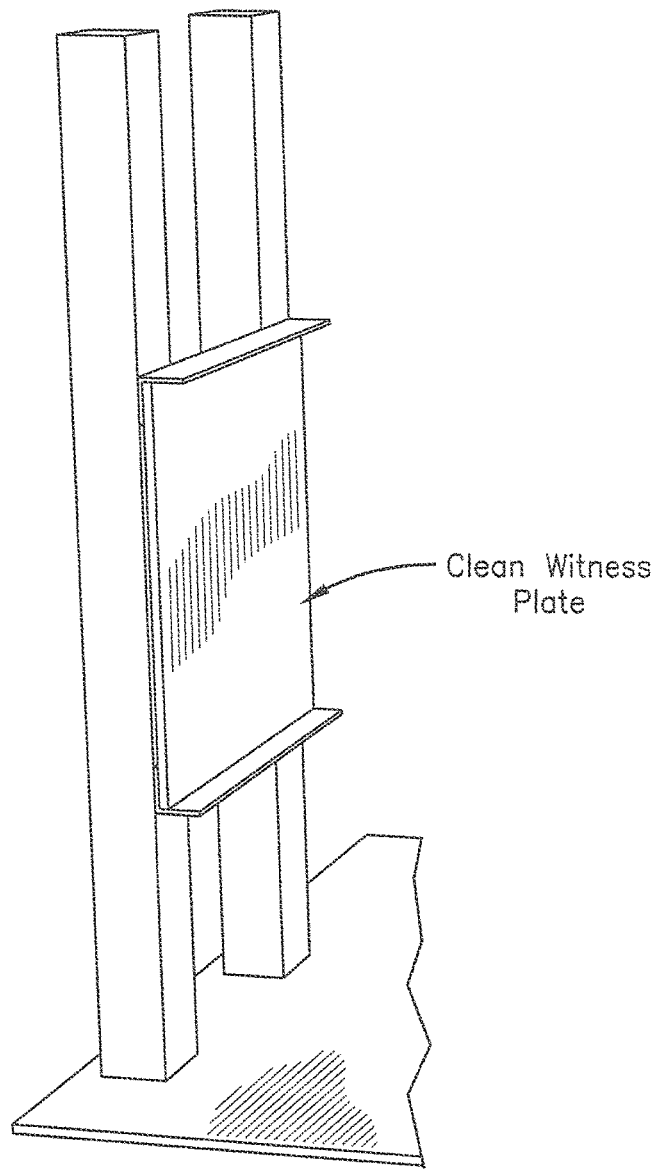
FIG. 25 is a schematic drawing of the witness plate of the test configuration of the present invention.

As shown in FIGS. 24 and 25, extensive damage was witnessed on the front side of the composite portion of the barrier (FIG. 24). However, no damage was observed on the witness plate (FIG. 25).

The velocity and firing interval data for the additional test plate armor system in accordance with the present invention is presented in Table 3.

TABLE 3

PROJECTILE VELOCITY AND INTERVAL DATA

|   | Oehler [ft/s] | Phantom [ft/s] | Projectile Weight [grains] | ΔTime from HS video [ms] |
|---|---|---|---|---|
| 1 | 2787 | 2796 | 693 | N/A |
| 2 | 2792 | 2810 | 693 | 101 |
| 3 | 2782 | 2797 | 692 | 98 |

STANAG (NATO Standardization Agreement) 4496-Fragment Impact Test

The objective of the test was to impact each candidate plate in a specified quadrant with a single North Atlantic Treaty Organization (NATO) standardized fragment with a nominal mass of 18.6 grams, traveling at a velocity of 8300+/−300 ft/s.

Figure 26:
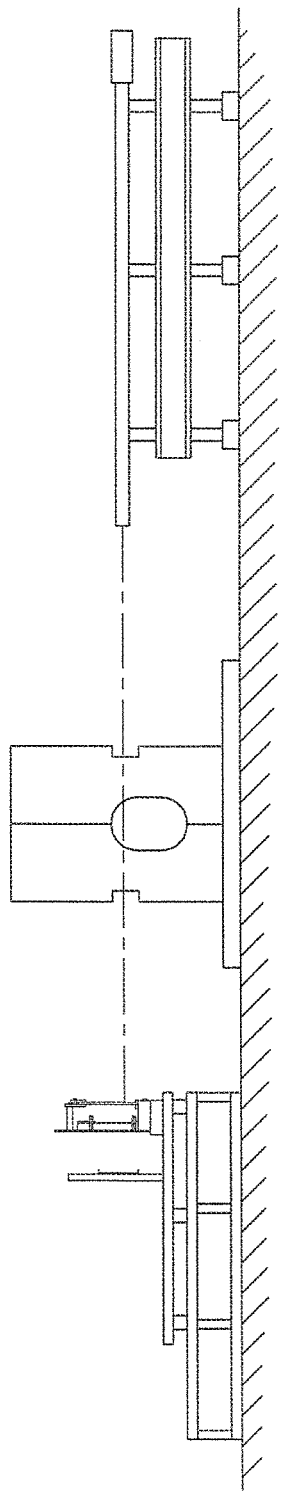
FIG. 26 is a schematic drawing of a fragment impact test configuration of the present invention.

The fragment was fired from a 40 mm High-Performance Powder Gun, which is an electrically-actuated, mechanically-fired cannon. A schematic depiction of the test site is shown in FIG. 26.

Figure 27:
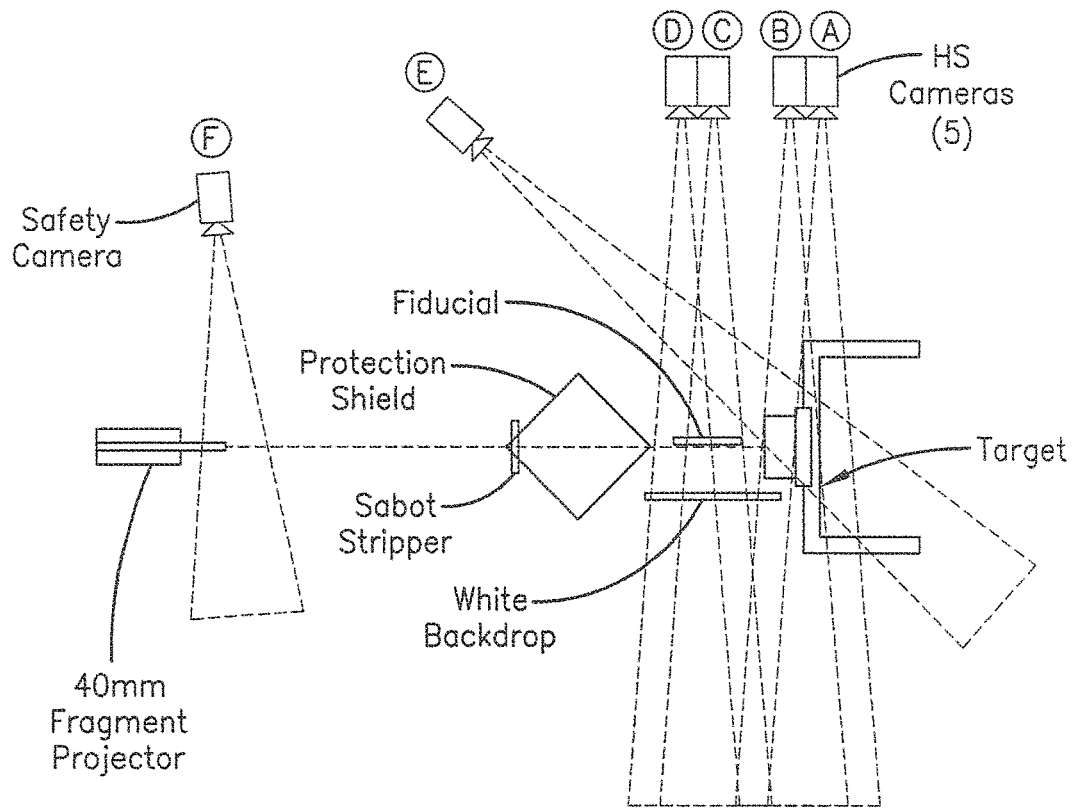
FIG. 27 is a schematic drawing of the fragment impact test instrumentation configuration of the present invention.

The instrumentation setup was as set forth as shown in FIG. 27.

Multiple cameras were used and their types and settings are described in the following Table 4. Cameras C and D were redundant units for each other.

TABLE 4

40 MM CANNON CAMERA SPECIFICATIONS

| Camera | Type | Frame Rate | Resolution | Exposure Time | Purpose |
|---|---|---|---|---|---|
| A | Phantom 7.3 | 6,400 frames/s | 800 × 600 | 3-10 μs* | Target Front/Rear Face |
| B | Phantom 7.3 | 6,400 frames/s | 800 × 600 | 3-10 μs* | Target Front/Rear Face |
| C | Phantom 710 | 12,000 frames/s | 1280 × 224 | 2 μs | Fragment Velocity |
| D | Phantom 710 | 12,000 frames/s | 1280 × 224 | 2 μs | Fragment Velocity |
| E | Phantom 7.3 | 6,400 frames/s | 800 × 600 | 3-10 μs* | Target Front Face |
| F | Video | 28 frames/s | standard | N/A | Muzzle safety |

*Adjusted for lighting conditions

Test Execution

Figure 28:
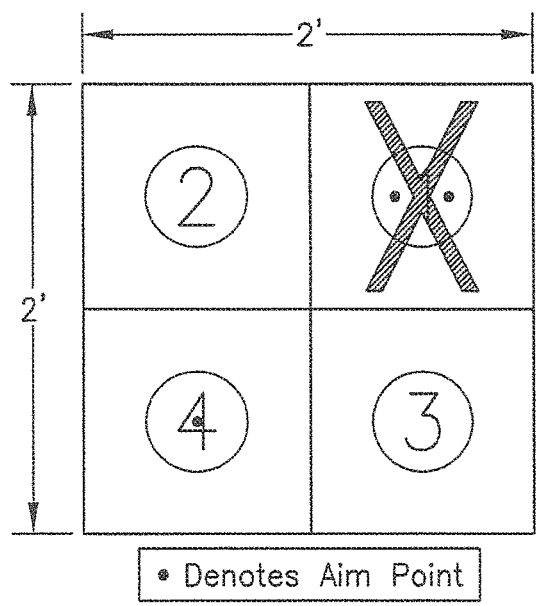
FIG. 28 is a schematic drawing of the fragment impact target points.

The same target fixture was utilized for both the bullet impact and fragment impact portions of the test. Mounting arrangements were identical, and a clean quadrant diagonally opposite of the previously targeted quadrant was used as illustrated in FIG. 28.

Test Plate

Figure 29:
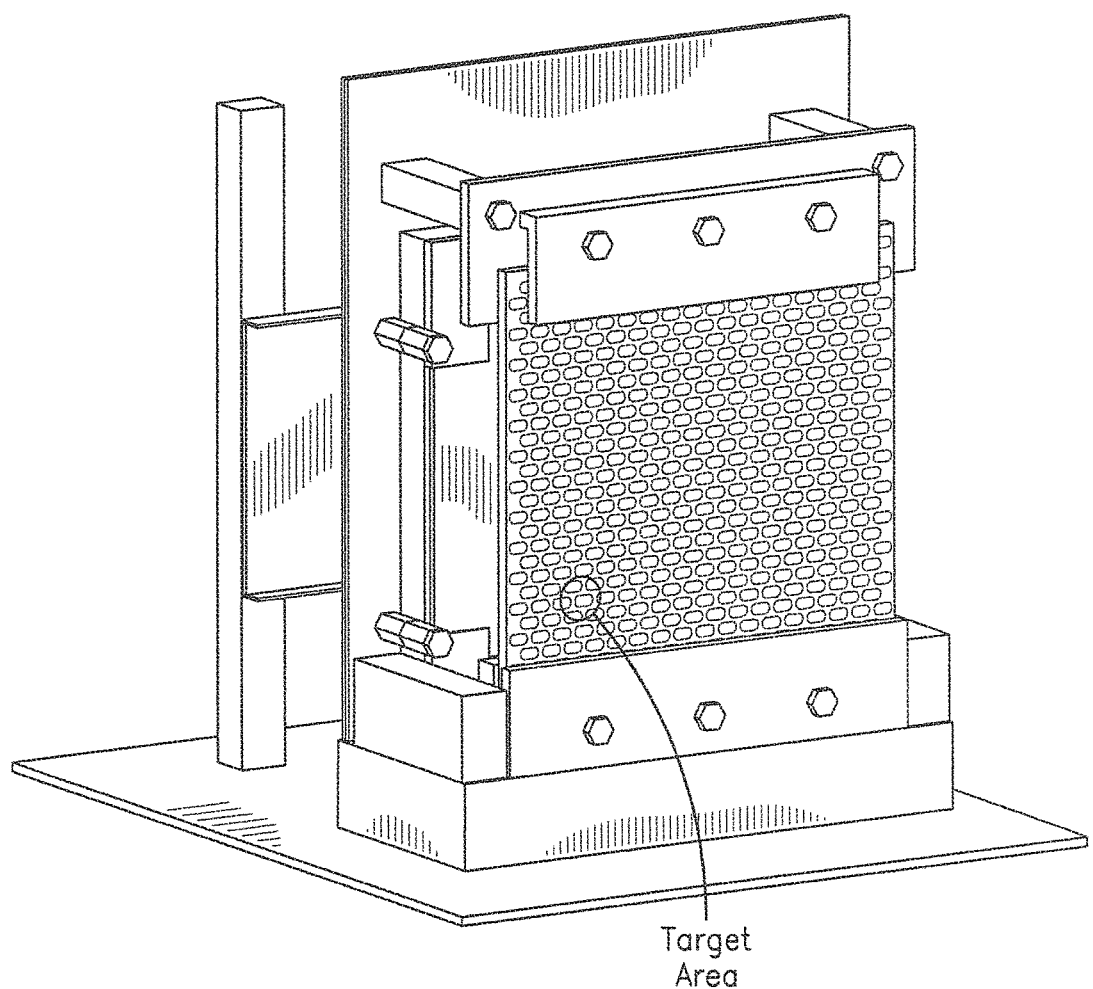
FIG. 29 is a schematic drawing of the test plate configuration pre-fragment impact test of the present invention.

The test plate was secured to the target test stand as shown in FIG. 29.

Figure 30:
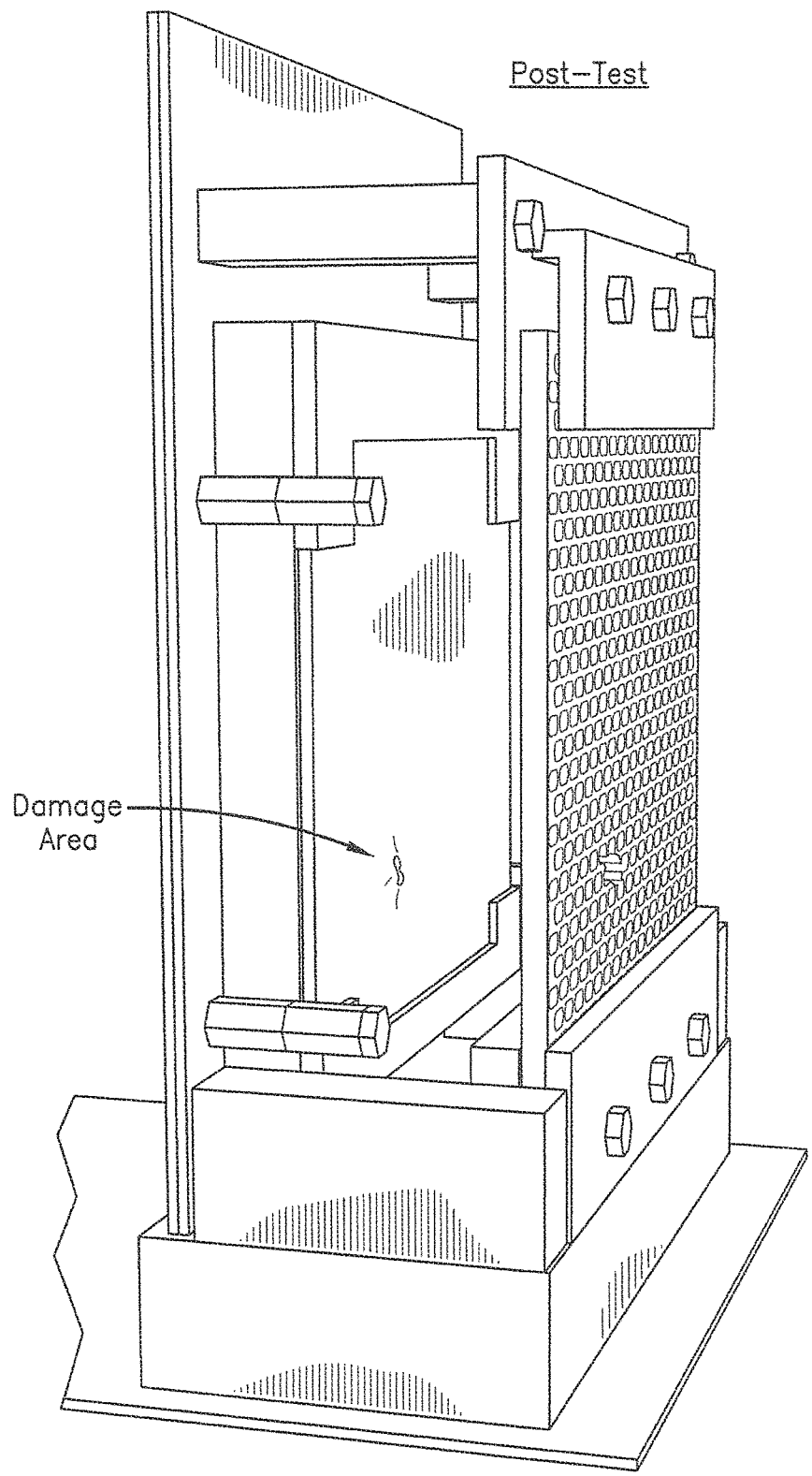
FIG. 30 is a schematic drawing of the test plate post-fragment impact test of the present invention.

A post-test inspection revealed that the fragment impacted at the intended aim point as shown in FIG. 30.

Figure 31:
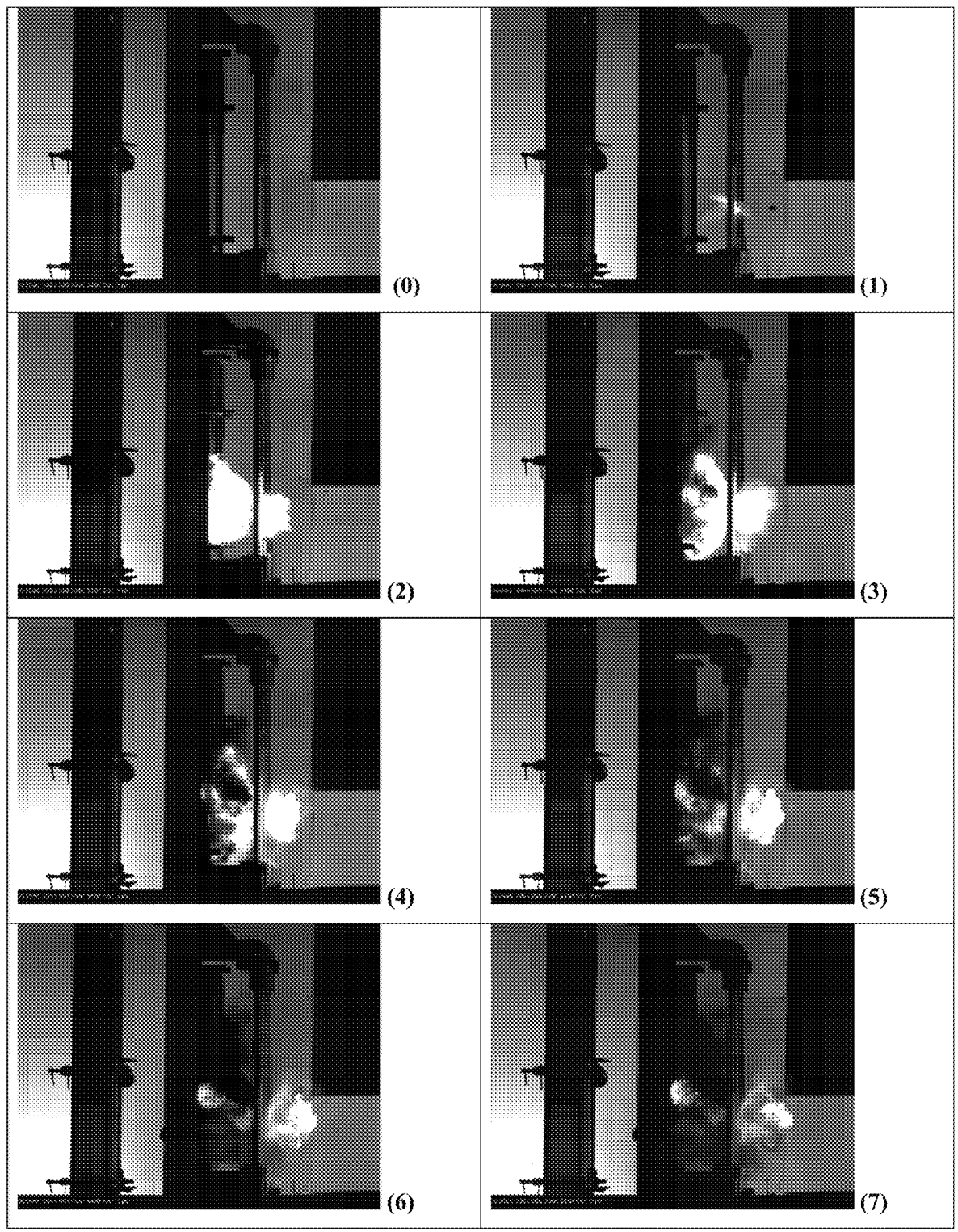
FIG. 31 is a sequence depicting test plate reactions during fragment impact testing of FIG. 28.

The test plate reactions during the fragment impact are shown in FIG. 31.

Figure 32:
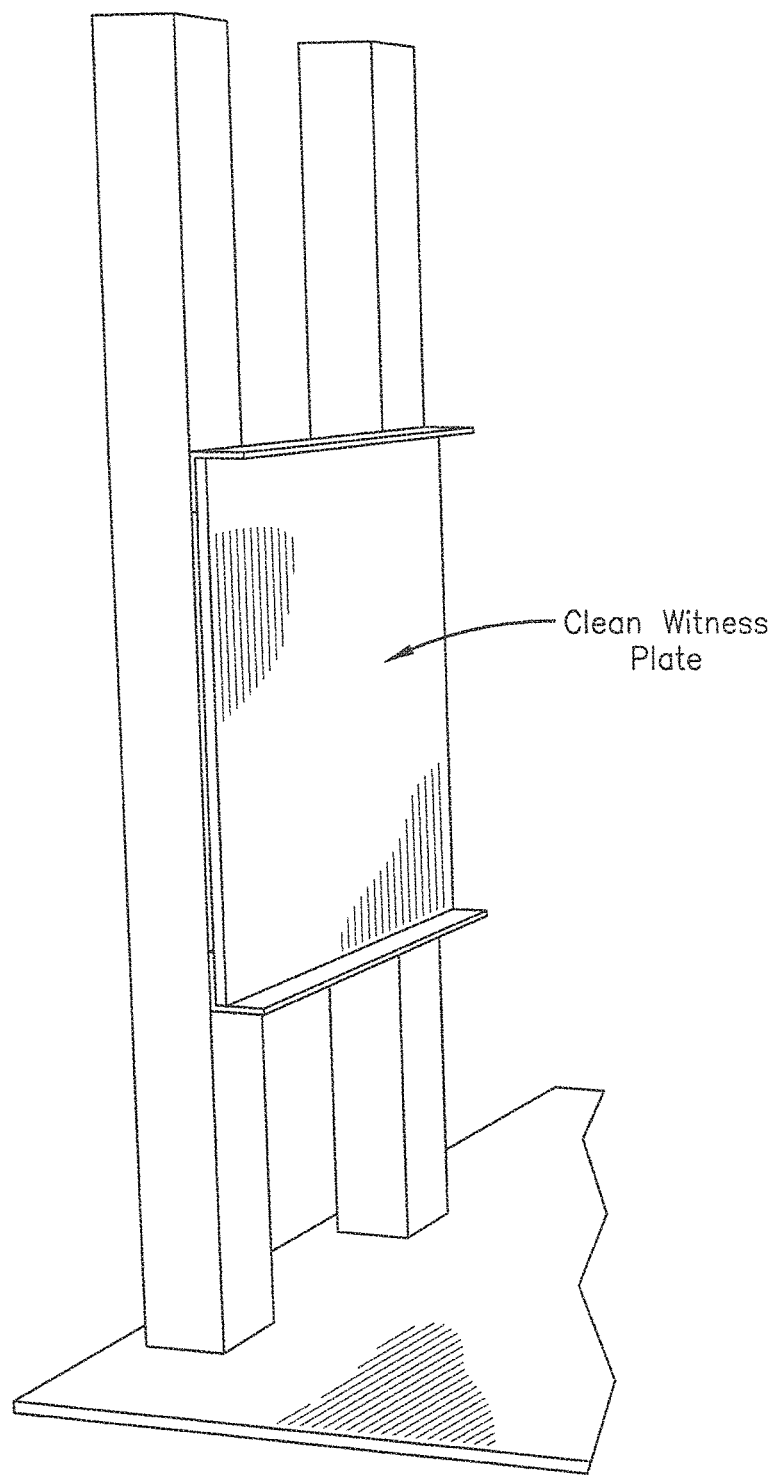
FIG. 32 is a schematic drawing of the witness plate post-fragment impact test of the present invention.

As shown in FIG. 32, the witness plate showed no evidence of fragment penetration.

The fragment velocity was measured using one primary and one redundant Phantom camera. The fragment velocity data is presented in the following Table 5.

TABLE 5

FRAGMENT PROPERTIES

| Shot Number | Phantom [ft/s] | Projectile Weight [grams] |
|---|---|---|
| 1 | 8231 | 18.5 |

Additional Test Plate

Figure 33:
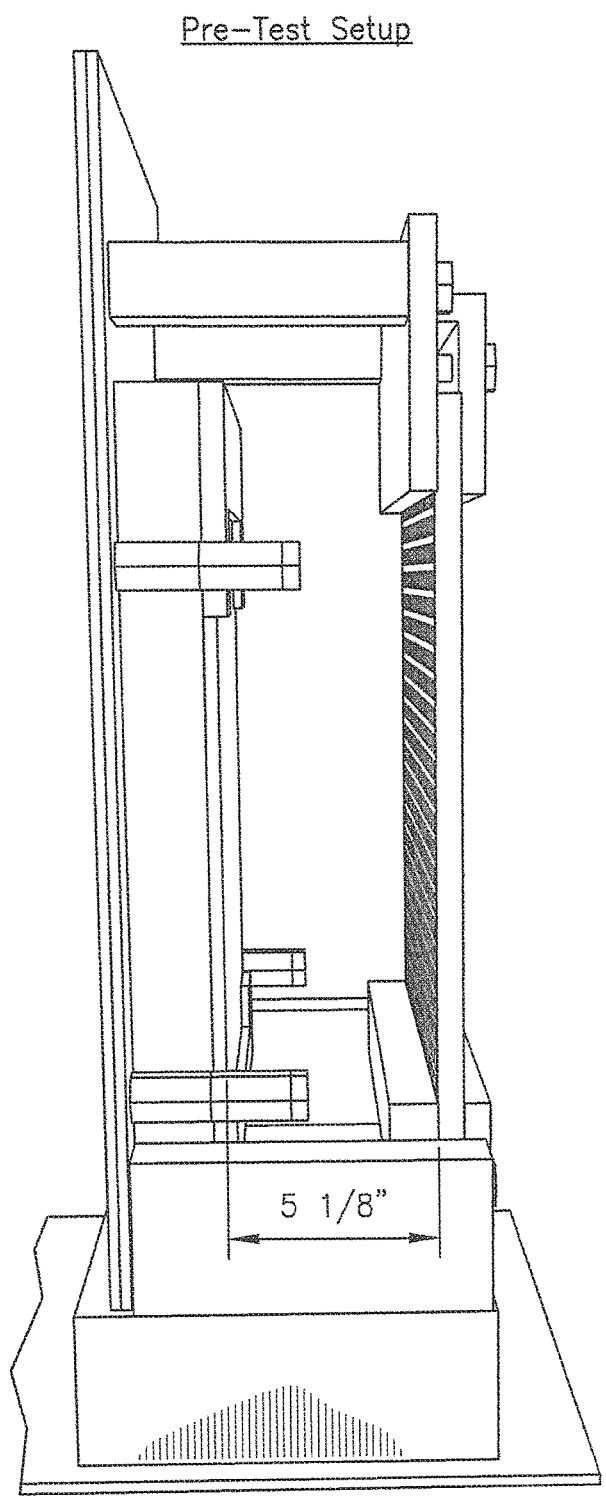
FIG. 33 is a schematic side view of the plate configuration during the fragment impact test of the present invention.

The additional test plate in accordance with the present invention was installed with the same standoff used for the bullet impact portion of the test. A distance of 5⅛-inches was measured from the back side of the grate to the face of the composite plate as shown in FIG. 33.

Figure 34A:
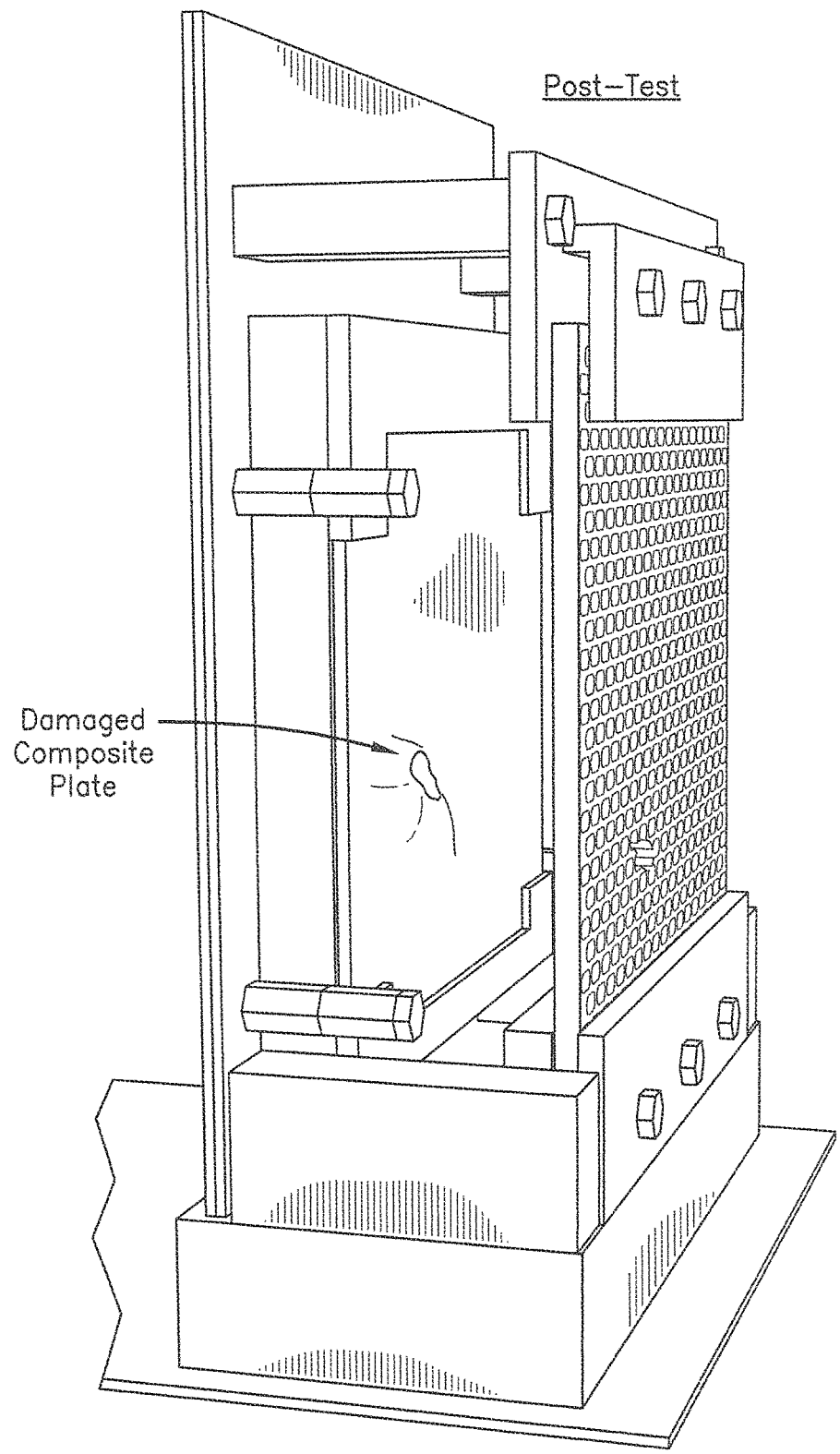
FIG. 34A is a schematic side view of the plate configuration post-fragment impact test of the present invention.
Figure 34B:
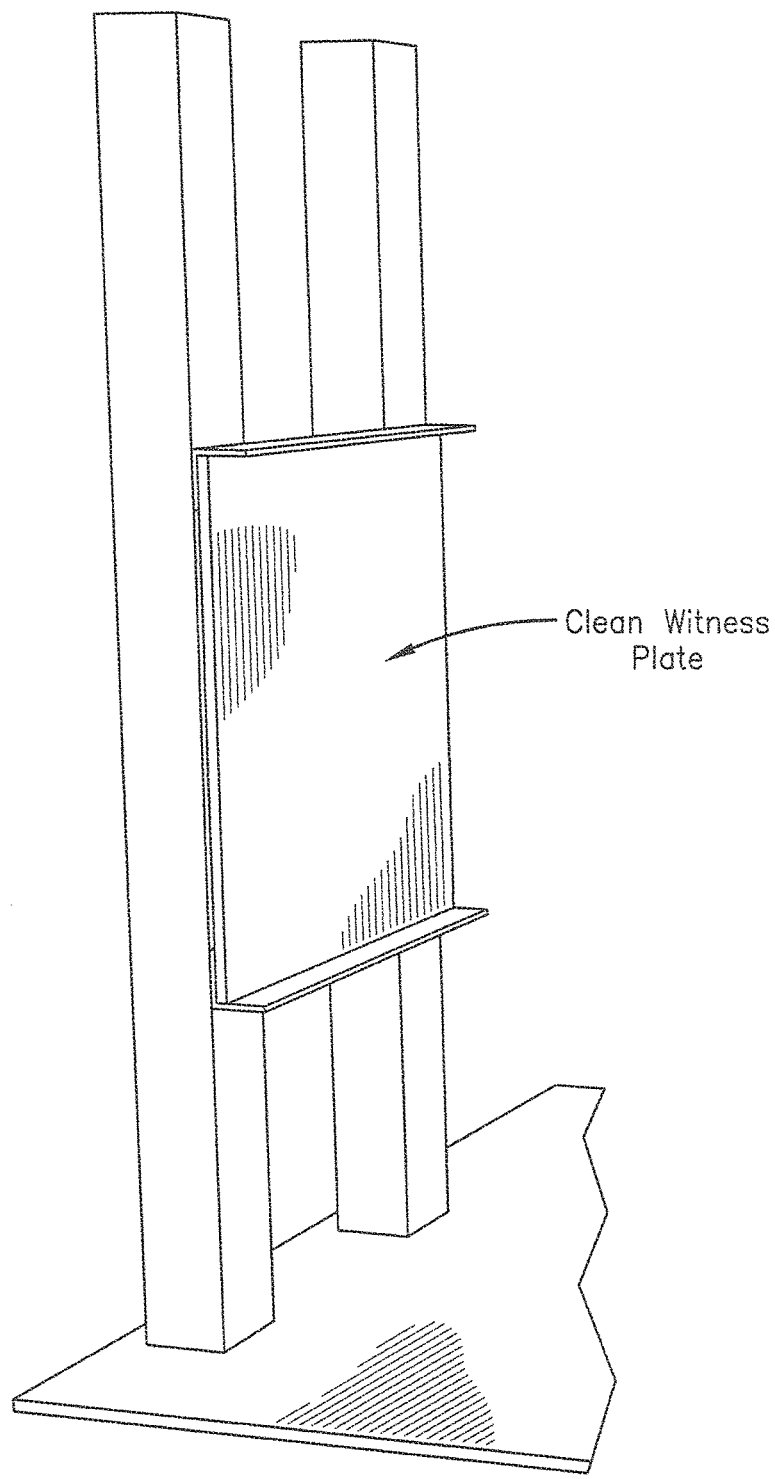
FIG. 34B is a schematic side view of the witness plate post-fragment impact test of the present invention.

The post-test inspection revealed a large amount of damage to the front of the composite plate and no damage to the witness plate, as shown in FIGS. 34A and 34B.

Figure 35:
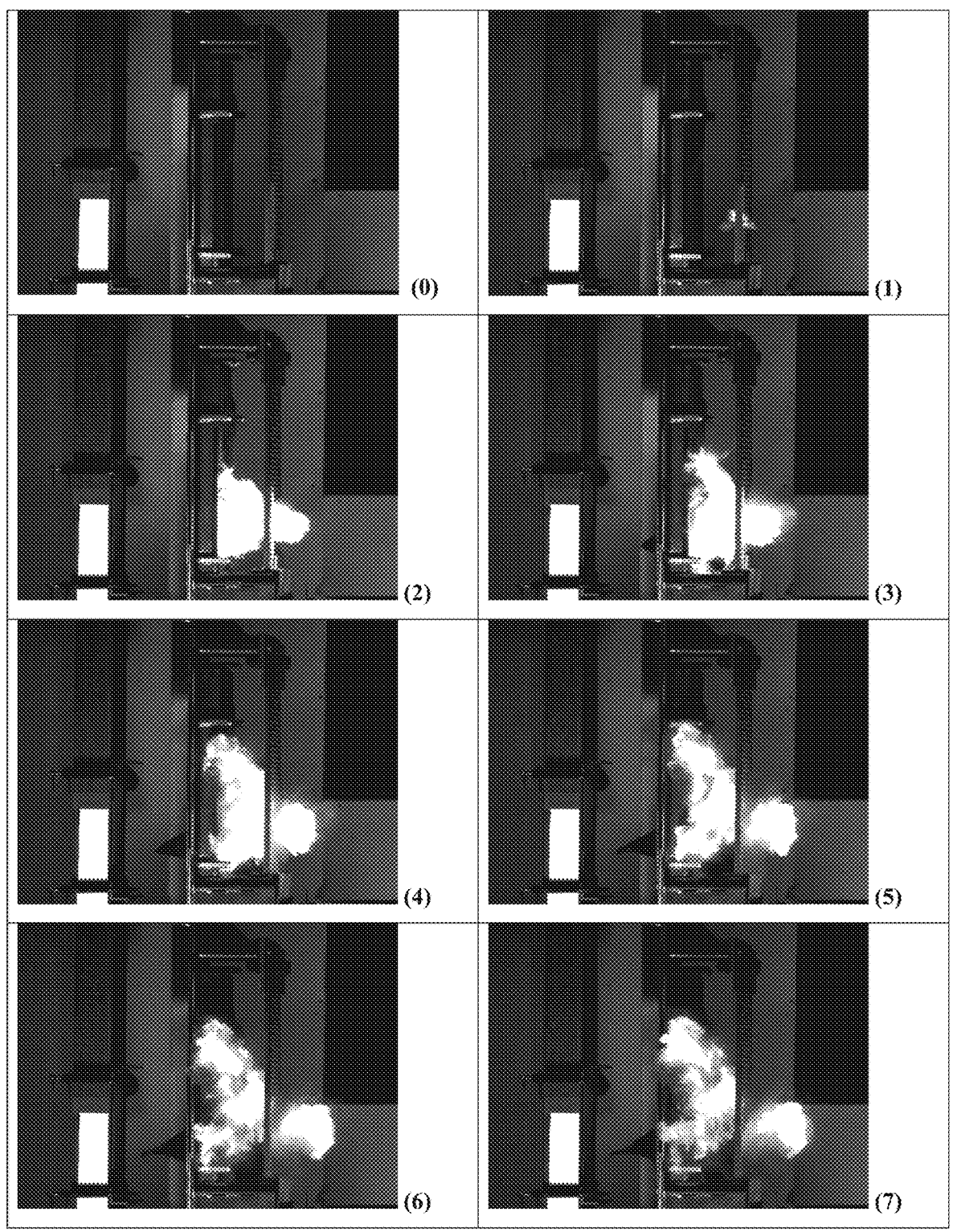
FIG. 35 is a sequence depicting reactions during the fragment impact testing of FIG. 33.

The reactions during the fragment impact are shown in the FIG. 35 along with associated frame number, as set forth below.

The velocity was measured using one primary and one redundant Phantom camera. The fragment velocity data is presented in the following
Table 7.

TABLE 7

FRAGMENT PROPERTIES

| Shot Number | Phantom [ft/s] | Projectile Weight [grams] |
|---|---|---|
| 1 | 8207 | 18.6 |

The tests were conducted in accordance with the approved test parameters. The projectile velocities and firing intervals for the bullet impact test were in accordance with STANAG 4241. The projectile velocity for the fragment impact test was in accordance with STANAG 4496.

It should be appreciated that the armor system in accordance with the present invention may be employed in any type of appropriate application for protection against high velocity and high caliber projectiles. Such applications for employment may include, but is not limited to, individual protective systems, i.e., body armor, armor for tanks, armor for ships or boats, armor for trucks, armor for vehicles, armor for aircraft including airplanes, jets and helicopters, armor for barriers, armor for protective structures, i.e., blast panels and armor for missile containers for storage or transport.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

We claim:

1. A ballistic armor system for insensitive munitions (IM) protection against projectiles for a missile canister comprising a transportation protection system comprising:
    a frame system comprising a top frame and side frames for securing a plurality of armor system panels to surround the missile canister including at least two sides, without the frame system touching the missile canister;
    the top frame configured to secure into and lock with side frames;
        wherein the side frames are secured to each armor system panel and wherein each armor system panel comprises:
        a metal strike face plate having a predetermined defined thickness and comprising a plurality of slotted holes set at an angle relative to the vertical orientation or axis of said metal strike face plate, said plurality of slotted holes being sufficiently small to prevent the passage of a projectile therethrough;
        a laminate composite backing material having a front surface and a rear surface and secured to said metal strike face plate or said frame system, wherein said laminate composite backing material comprises a cross-sectional composition of a backing material of fibers being composed of at least one material selected from the group consisting of aramid fiber, S-glass, E-glass and UHMWPE, and being in combination with a polymer resin-based binder material; and
        an air space provided between said metal strike face plate and said composite backing material in a range of from about 4 to about 6 inches, wherein said metal strike face plate is separated from said composite backing material by said air space;
        wherein said system has a weight of about 23 pounds/ft$^2$,
        wherein each hole of said plurality of slotted holes is angled relative to the vertical orientation or axis of said metal strike face plate in the range of 0°-60° relative to the vertical orientation or axis of said metal strike face plate;
        wherein said metal strike face plate comprises a thickness in the range of about ¼ inch-1.5 inches;
        wherein said laminate composite backing material comprises a thickness of about 2 inches;
        wherein at least one of said front surface and said rear surface of said laminate composite backing material is exposed to air; and
        wherein said system at least meets the appropriate military ballistic specifications and test requirements for the test of defeating the threat defined in STANAG 4241 by stopping three (3) 50-caliber bullets shot at a velocity of 850±20 m/s within a 5 cm diameter area and shot in a time interval of ¹⁄₁₀ second apart.

2. The ballistic armor system according to claim 1, wherein said metal strike face plate is a perforated metal, and said metal strike face plate comprises at least one material selected from the group consisting of steel, cast irons, aluminum, magnesium and titanium.

3. The ballistic armor system according to claim 1, wherein said laminate composite backing material comprises a cross-sectional composition of a backing material of fibers selected from the group consisting of aramid fiber, S-glass, E-glass and UHMWPE, and being in combination with a polymer resin-based binder material selected from the group consisting of silicones, epoxies, urethanes, polyethylenes, polyurethanes and polyureas.

4. The ballistic armor system according to claim 1, further comprising an additional protective layer selected from the group consisting of a polymer layer, a composite layer and a metal skin layer for covering the front face of said metal strike face plate, wherein said additional protective layer comprises a material being the same as or different from the material of said metal strike face plate.

5. The ballistic armor system according to claim 4, wherein said polymer layer, composite layer or metal skin layer comprises a thickness in the range from about ⅛ inch to about ¼ inch.

6. The ballistic armor system according to claim 1, wherein said plurality of slotted holes are set at an oblique angle in the range of about 20°-60° relative to the vertical orientation of said metal strike face plate.

7. The ballistic armor system according to claim 1, wherein said laminate composite backing material comprises a thickness of about 1-4 inches.

8. The ballistic armor system according to claim 1, wherein said metal strike face plate and said laminate composite backing material are secured together by a mechanical threaded securing mechanism.

9. The ballistic armor system according to claim 1, wherein said laminate composite backing material further comprises a layer of high tensile strength material adjacent to said cross-sectional composition and forming at least a portion of said cross-sectional composition.

10. The ballistic armor system according to claim 9, wherein said layer of high tensile strength material is a high tensile strength urethane board.

11. The ballistic armor system according to claim 9, wherein said layer of high tensile strength material has a thickness in the range of about ¼ inch-4 inches.

12. The ballistic armor system according to claim 1, wherein the at least one material is UHMWPE, wherein said UHMWPE is a ballistic grade UHMWPE cloth.

13. The ballistic armor system according to claim 1, wherein said laminate composite backing comprises a polymer resin-based binder material-based encapsulation having a bottom layer, side layers and a top layer for encapsulating said layered configuration comprising said laminate composite backing.

14. The ballistic armor system according to claim 13, wherein said polymer resin-based binder material is at least one material selected from the group consisting of silicone, epoxy, polyurethane, polyethylene, urethane and polyurea.

15. The ballistic armor system according to claim 13, wherein said polymer resin-based binder material-based encapsulation comprises a thermoset elastomeric resin having a hardness via ASTM D 2240 of Shore 60A-60D; Ultimate Tensile Strength (psi), via ASTM D 412: 1200-9000 psi; Modulus at 100% elongation (psi), via ASTM D412: 400-2200 psi; Modulus at 300% elongation (psi), via ASTM D412: 700-5000 psi and Elongation-to-break (%), via ASTM D412: 150-1000.

16. The ballistic armor system according to claim 15, wherein said polymer resin-based binder material-based encapsulation comprises a thermoset elastomeric resin having a hardness via ASTM D 2240 of Shore 75A-55D; Ultimate Tensile Strength (psi), via ASTM D 412: 3000-8000 psi; Modulus at 100% elongation (psi), via ASTM D412: 700-1500 psi; Modulus at 300% elongation (psi), via ASTM D412: 900-4000 psi and Elongation-to-break (%), via ASTM D412: 300-800.

17. The ballistic armor system according to claim 1, wherein said armor system at least meets the test of stopping three (3) 50-caliber bullets shot within a 2-inch diameter area and shot in a time interval of 1/10 second apart.

18. The ballistic armor system according to claim 1, wherein each hole of said plurality of slotted holes in the strike face plate comprises an oblong-shaped configuration defined by two opposing arced ends each having a focal point, wherein the distance between the respective focal points of the opposing arced ends is about 1/2 inch.

19. The ballistic armor system according to claim 18, wherein the oblong-shaped configuration comprises a rectangular center portion having a length of about 0.50", an arc-ended radius of 0.1875" and wherein each hole of said plurality of slotted holes is at an angle of about 20-40 degrees measured from the vertical orientation of the strike face plate.

20. A ballistic armor system for insensitive munitions (IM) protection against projectiles for a missile canister comprising a transportation protections system comprising:
a frame system comprising a top frame and side frames for securing a plurality of armor system panels to surround the missile canister including at least two sides without the frame system touching the missile canister;
the top frame configured to secure into and lock with the side frames;
wherein the side frames are secured to each armor system panel and wherein each armor system panel comprises:
a metal strike face plate having a predetermined defined thickness and comprising a plurality of slotted oblong holes set at an oblique angle relative to the vertical orientation or axis of said metal strike face plate, wherein said angle is in the range of about 20°-40° relative to the vertical orientation of said metal strike face plate, said plurality of slotted holes being sufficiently small to prevent the passage of a projectile therethrough;
a laminate composite backing material secured to said metal strike face plate or said frame system, wherein said laminate composite backing material comprises a cross-sectional composition of a backing material of fibers being at least one material selected from the group consisting of aramid fiber, S-glass, E-glass and UHMWPE, and being in combination with a polymer resin-based binder material; and
an air space provided between said metal strike face plate and said composite backing material, wherein said metal strike face plate is separated from said composite backing material by said air space, wherein said air space comprises a thickness in the range of 4-6 inches;
wherein said system has a weight of about 23 pounds/ft$^2$,
wherein each hole of said plurality of slotted holes is angled relative to the vertical orientation or axis of said metal strike face plate in the range of about 20°-40° relative to the vertical orientation or axis of said metal strike face plate;
wherein said metal strike face plate comprise a thickness in the range of about 1/4 inch-1.5 inch;
wherein said laminate composite backing material comprises a thickness of about 2 inches; and
wherein said system at least meets the appropriate military ballistic specifications and test requirements for the test of defeating the threat defined in STANAG 4241 by stopping three (3) 50-caliber bullets shot at a velocity of 850±20 m/s within a 5 cm diameter area and shot in a time interval of 1/10 second apart.

21. The ballistic armor system according to claim 20, wherein said angle is in the range of 25°-35° relative to the vertical orientation of said metal strike face plate.

22. The ballistic armor system according to claim 20, wherein said metal strike face plate is selected from the group consisting of a cast-formed metal strike face plate, a punch-formed metal strike face plate, a water jet cut-formed metal strike face plate, a plasma cut-formed metal strike face plate and a laser cut-formed metal strike face plate.

23. A ballistic armor system for insensitive munitions (IM) protection against projectiles for a missile canister comprising a transportation protection system comprising:
a frame system comprising a top frame and side frames for securing a plurality of armor system panels to surround the missile canister including at least two sides without the frame system touching the missile canister;
the top frame configured to secure into and lock with side frames;
wherein the side frames are secured to each armor system panel and wherein each armor system panel comprises:
a metal strike face plate comprising a perforated metal, said metal strike face plate having a predetermined defined thickness and comprising a plurality of slotted holes set at an angle relative to the vertical orientation or axis of said metal strike face plate, said plurality of slotted holes being sufficiently small to prevent the passage of a projectile therethrough;
a laminate composite backing material having a front surface and a rear surface and secured to said metal strike face plate or said frame system, wherein said laminate composite backing material comprises a cross-sectional composition of a backing material of fibers being composed of at least one material selected from the group consisting of aramid fiber, S-glass, E-glass and UHMWPE, and being in combination with a polymer resin-based binder material;
wherein said system has a weight of about 23 pounds/ft$^2$,
wherein said metal strike face plate and said laminate composite backing material define an air space therebetween, said airspace having a thickness in a range of about 4 to about 6 inches;
wherein each hole of said plurality of slotted holes is angled relative to the vertical orientation or axis of said metal strike face plate in the range of 0°-60° relative to the vertical orientation or axis of said metal strike face plate;
wherein said metal strike face plate comprises a thickness in the range of about 1/4 inch-1.5 inch;
wherein said laminate composite backing material comprises a thickness of about 2 inches;

wherein at least one of said front surface and said rear surface of said laminate composite backing material is exposed to air; and wherein said system at least meets the appropriate military ballistic specifications and test requirements for the test of defeating the threat defined in STANAG 4241 by stopping three (3) 50-caliber bullets shot at a velocity of 850±20 m/s within a 5 cm diameter area and shot in a time interval of 1/10 second apart.

24. A ballistic armor system for insensitive munitions (IM) protection against projectiles for a missile canister comprising a transportation protection system comprising:

a frame system comprising a top frame and side frames for securing a plurality of armor system panels to surround the missile canister including at least two sides without the frame system touching the missile canister;

the top frame configured to secure into and lock with side frames wherein the side frames are secured to each armor system and wherein each armor system panel comprises:

a metal strike face plate having a predetermined defined thickness and comprising a plurality of slotted holes set at an angle relative to the vertical orientation or axis of said metal strike face plate, said plurality of slotted holes being sufficiently small to prevent the passage of a projectile therethrough;

a laminate composite backing material having a front surface and a rear surface and secured to said metal strike face plate or said frame system, wherein said laminate composite backing material comprises a cross-sectional composition of a backing material of fibers being composed of at least one material selected from the group consisting of aramid fiber, S-glass, E-glass and UHMWPE, and being in combination with a polymer resin-based binder material, said laminate composite backing material having a thickness of about 2 inches; and an air space provided between said metal strike face plate and said laminate composite backing material in a range of from about 4 to about 6 inches, wherein said metal strike face plate is separated from said composite backing material by said air space, wherein said system has a weight of about 23 pounds/ft$^2$, wherein at least one of said front surface and said rear surface of said laminate composite backing material is exposed to air; and wherein said system at least meets the appropriate military ballistic specifications and test requirements for the test of defeating the threat defined in STANAG 4241 by stopping three (3) 50-caliber bullets shot at a velocity of 850±20 m/s within a 5 cm diameter area and shot in a time interval of 1/10 second apart.

* * * * *